US007324953B1

(12) United States Patent
Murphy

(10) Patent No.: US 7,324,953 B1
(45) Date of Patent: Jan. 29, 2008

(54) DEMOGRAPHIC INFORMATION DATABASE PROCESSOR

(76) Inventor: Danny Murphy, 8422 Guthrie Rd., Cross Plains, TN (US) 37049

( * ) Notice: Subject to any disclaimer, the term of this patent is extended or adjusted under 35 U.S.C. 154(b) by 211 days.

(21) Appl. No.: 09/638,089

(22) Filed: Aug. 11, 2000

Related U.S. Application Data

(60) Provisional application No. 60/148,847, filed on Aug. 13, 1999.

(51) Int. Cl.
*G06E 1/00* (2006.01)

(52) U.S. Cl. .................. 705/10; 705/500; 705/1; 705/26; 709/203

(58) Field of Classification Search .............. 705/7, 705/8, 9, 14, 10, 27, 1, 26, 300, 203
See application file for complete search history.

(56) References Cited

U.S. PATENT DOCUMENTS

| | | | | |
|---|---|---|---|---|
| 5,539,635 | A * | 7/1996 | Larson, Jr. ............... | 700/234 |
| 5,825,876 | A * | 10/1998 | Peterson, Jr. ............ | 705/52 |
| 5,913,204 | A * | 6/1999 | Kelly ....................... | 705/500 |
| 5,918,213 | A * | 6/1999 | Bernard et al. ........... | 705/26 |
| 5,963,916 | A * | 10/1999 | Kaplan .................... | 705/26 |
| 5,974,396 | A * | 10/1999 | Anderson et al. ........ | 705/10 |
| 6,020,883 | A * | 2/2000 | Herz et al. ............... | 345/721 |
| 6,023,688 | A * | 2/2000 | Ramachandran et al. | 705/44 |
| 6,078,892 | A * | 6/2000 | Anderson et al. ........ | 705/10 |
| 6,108,640 | A * | 8/2000 | Slotznick ................. | 705/26 |
| 6,177,940 | B1 * | 1/2001 | Bond et al. ............... | 345/352 |
| 6,216,129 | B1 * | 4/2001 | Eldering .................. | 707/10 |
| 6,226,672 | B1 * | 5/2001 | DeMartin et al. ........ | 709/219 |
| 6,266,649 | B1 * | 7/2001 | Linden et al. ............ | 705/26 |
| 6,298,348 | B1 * | 10/2001 | Eldering .................. | 707/10 |
| 6,330,593 | B1 * | 12/2001 | Roberts et al. .......... | 709/217 |
| 6,338,044 | B1 * | 1/2002 | Cook et al. .............. | 705/14 |
| 6,545,209 | B1 * | 4/2003 | Flannery et al. ......... | 84/609 |
| 6,587,127 | B1 * | 7/2003 | LeeKe et al. ............. | 345/765 |

OTHER PUBLICATIONS

"MusicMatch First to Integrate Windows Media Video to Jukebox, Delivers Most Complete Windows Media Experience", PR NEWSWIRE, Nov. 30, 1999, Journal Code: WPRW, Dialog File 20, Acc. 08462333.*

(Continued)

*Primary Examiner*—Zeender Ryan Florian
*Assistant Examiner*—Vanel Frenel
(74) *Attorney, Agent, or Firm*—Thomas Kayden; Horstemeyer & Risley, L.L.P.; Larry W. Brantley

(57) ABSTRACT

An apparatus and method for collecting and analyzing demographic information for consumer preference information. The system includes a computer database system adapted to accept and store product information and demographic information, and an open participation system with access over a wide area network to collect consumer preference information for storage in the computer database system. The method includes providing a computer information database for storing product information and demographic information, storing product information in the database, providing communication access through the wide area network, collecting user identification information, storing the collected user identification information in the database, enabling user access to the product information over the wide area network, collecting user preference information relating to the product information over the wide area network, and storing the collected user preference information in the database.

45 Claims, 4 Drawing Sheets

OTHER PUBLICATIONS

Rate-A-Record's Front Desk Check-In; Rate-A-Record; 1997; 1 page; Nashville, TN.
Rate-A-Record.com Home Page; Rate-A-Record; 1997; 2 pages; Nashville, TN.
Rate-A-Record.com and Song Title Position Artist Listing; Rate-A-Record; 1997; 2 pages; Nashville, TN.
Rate-A-Record.com Country Pick Hits in the Spotlight; Rate-A-Record; 1997; 1 page; Nashville, TN.
The Country Top 40 Chart: No. 1, voting pate; Rate-A-Record; 1997; 1 page; Nashville, TN.
Rate-A-Record Front Desk Check-In Information listing; Rate-A-Record; 1997; 1 page; Nashville, TN.
Your Favorite Country Artist or Group; Rate-A-Record; 1997; 1 page; Nashville, TN.
Rate-A-Record Surveys Your Record Collection; Rate-A-Record; 1997; 1 page; Nashville, TN.
Manual tabulation of information for song title Something that we do; Rate-A-Record; 1997; 1 page; Nashville, TN.
E-Mail for article 109156; Rate-A-Record; 1997; 1 page; Nashville, TN.
Letter to Dale Turner dated Jun. 5, 1997; Rate-A-Record; 1997; 2 pages; Nashville, TN.
Letter to Dale Turner dated Jun. 23, 1997: Rate-A-Record; 1997; 1 page; Nashville, TN.
Letter to Stan Byrd dated Jul. 3, 1997; Rate-A-Record; 1997; 1 page; Nashville, TN.
Letter to Dale Turner dated Jul. 8, 1997; Rate-A-Record; 1997; 1 page; Nashville, TN.
Letter to Stan Moress dated Oct. 6, 1997; Rate-A-Record; 1997; 1 page; Nashville, TN.
Letter to all program directors dated Feb. 4, 1997; Rate-A-Record; 1997; 1 page; Nashville, TN.

* cited by examiner

DEMOGRAPHIC INFORMATION DATABASE PROCESSOR

This application claims benefit of now abandoned Provisional U.S. patent application Ser. No. 60/148,847 filed Aug. 13, 1999, entitled "Demographic Information Database Processor" which is hereby incorporated by reference.

OVERVIEW

The present invention relates generally to a method and apparatus for the collection of consumer preference information. More particularly, this invention pertains to 1) a a new and useful method and apparatus that will provide the means for consumers to participate in the selection of music, 2) a new and inventive computer demographic collection system with an associated data retrieval mechanism using a wide area network providing for more comprehensive collection of consumer preference information, 3) a system for the input of song information and an associated song identification system, 4) an open participation system, for Registered Members (RM), for collecting and gathering music consumer preference information which can be sorted and reported dynamically to clients based on various demographic and geographic parameters, chosen by the client, and 5) a system that allows a client to continually refine and manipulate the search parameters for the extraction of more concise, microscopically precise, information for the evaluation of a more specific and/or particular demographic group for music and other forms of research. The present invention relates to the collection and gathering and the sorting and reporting of consumer preference information with regard to music and, in particular, to a method and apparatus for:

(1) enabling users access to a registration database for the collection of their demographic and geographic information;

(2) enabling users access to a song database for the collection of user preference information as it relates to music, resulting in an update to an information database that stores their preferences;

(3) enabling client access to an information database providing the ability to query said database by various demographic and geographic parameters with relationship to various user preferences and;

(4) enabling an administrative and operational access interface mechanism that provides for the input of song information to the database, update of song database information, email retrieval, issuance of accounts, and the retrieval of song preference information.

BACKGROUND OF THE INVENTION

The business structure of the music industry is complex and challenging. For record labels, its complexity lies within the record labels' almost total dependence upon radio to generate product, i.e. pre-recorded music, sales through the exposure of its product to the public via radio airplay. The goal of record labels is to sell music product. The sales success of record labels depends, to a great extent, upon their ability to get their newly released songs exposed to the public and played on the radio.

Radio is an industry with a totally different goal, that being to generate profit from the sale of airtime advertising, the value of which is determined by the size and demographics of its audience. The goal of radio is to sell advertising. Radio stations do not directly make money by playing music, however record labels are dependent upon radio stations for the exposure of their product. One problem that currently exists is that record labels are subject to the decision making process of radio station programming department personnel and others described herein.

For record labels, the challenge is to select and release singles that not only consumers and listeners want to hear, but more importantly, singles that radio will be receptive to and will play. It is obvious how vitally important it is for record labels to be able to accurately identify these songs PRIOR to release to radio, and, once the song is released, to have documented market by market, station by station research information for radio promotion efforts. Another problem is that current decision making methods do not provide record labels with the ability to interact with a large percentage of the population universe. Labels are unable to interact with the population universe of consumers and are therefore, unable to make use of the wealth of consumer preference information that would be available if a gathering and collection and sorting and reporting method were available, thereby taking this information into account in the decision making process with regard to what song should be released as a single. Labels have extreme difficulty identifying what song should be released and desire a cost effective method that will allow for the collection of consumer preference information from a larger population universe or sample than that currently employed in current research methods, all increasing the rate of success with regard to the release of new singles. The invention described herein alleviates the problems experienced by record labels described thus far.

For the radio industry, the challenge is to attract and keep listeners. They do so by playing songs that are proven to be familiar to listeners. Familiar songs keep the maximum number of listeners tuned in and allow the station to keep advertising rates at a premium. Newly released songs are obviously not familiar immediately upon release. Consequently, radio is hesitant to "add" a new/unfamiliar song immediately upon release. This scenario is compounded tremendously when a new artist releases a new song. Thus, if radio does not elect to add a song to a playlist, the listening public may never know the song exists, and as a result, artists and record labels suffer.

Further complicating the music business landscape is the Telecommunications Act of 1996, which increased the number of stations radio groups can own in a market. Tremendous consolidation in the radio industry has resulted. Consequently, "group" programming decisions are often made and stations seem to depend upon and cater to "recurrents" in programming, regardless of specific market demographics and associated consumer preferences in those specific markets. "Recurrents" can be defined as songs that have previously been "hits" and are therefore proven to be familiar to listeners. Keep in mind, stations derive income from the sale of advertising, and therefore, maintaining a listener base is of tremendous importance. The fear of losing listeners or the need to maintain a listener base, many times, requires a conservative programming approach which tends to rely heavily on Recurrents, a programming strategy that can be viewed as having less risk when compared to programming newly released material.

To a great extent, stations also rely upon "consultants" to assist in their programming efforts. Consultants typically utilize song research methods which recently have come under fire for being "badly gathered," and "grossly in error about the true appeal of the music." From this research information, many times, across the board programming decisions are made, resulting, once again, in less than "current" songs being programmed, with the playlist catering to Recurrents.

Furthermore, there is a "pre-selection" procedure employed within the stations' programming department and by the consultants whereby a certain number of songs released by the labels are rejected after being heard by either station personnel or consultants, with no or very little exposure to the listener(s). It would not be uncommon for some songs to be eliminated from further consideration based on the decisions made by the station personnel or consultants.

Therein lies another problem. Certainly, it is near impossible for one, two or even a small and/or limited group of individuals to accurately identify what listeners and music consumers within a specific city would like to hear.

Labels, consultants and radio stations also employ "focus group," "auditorium" and "call-out" research to determine consumer appeal. Many times in each case, a "predetermined" set of participants are selected to participate in the testing, based on preconceived ideals established by the label or station. For example, they may be interested in gathering information pertaining to a song or songs with regard to females, who meet certain age, income and education levels.

Yet, this creates another problem. What about all of the other possible combinations of individuals in the population universe that might like the song who have been eliminated from participating and having a voice in the music industry? The invention somewhat reverses the current process of labels and stations creating a product only to have to go looking to identify who likes the product. The invention provides consumers with the opportunity to identify themselves. The user comes to the manufacturer as opposed to the manufacturer going to the user. To a certain degree, the decision making process with regard to single selection on the part of a record label and the corresponding "add" decision on the part of a radio station could be likened to a "guessing game."

Obviously, the record and radio industries have a definite tie, a dependence upon each other, but have different agendas. The question arises: Are stations playing what the listeners want to hear, or what the stations want the listeners to hear?

What is needed, then, is an exposure medium that provides music consumers with access to all new releases by established artists and all new releases by new artists and a universal, large scale information collection apparatus that provides the universe of music consumers with the ability to convey preference information which can then be retrieved and sorted by various demographic and geographic parameters by the music industry, defined as record labels, radio stations and music retailers, thereby insuring that record labels release songs which they know "test" well among radio listeners and furthermore insuring that radio stations can accurately identify the songs their specific listeners want to hear.

Also, what has been needed is a method that provides for the one to one communication with music consumers. To this stage, when a music consumer makes a purchase, the industry has been unable to accurately and specifically identify the qualities of who that consumer is and have been unable to interact and communicate with that consumer.

What is needed then is a system that combines all of these qualities.

SUMMARY OF THE INVENTION

The purpose of the invention is to provide a new, improved, and unique method and apparatus for the collection and gathering, and the sorting and reporting, of consumer preference information via the invention of the demographic database processor. Deficiencies in prior art are overcome with this invention.

Based on the information collected, the invention will capture and tabulate for the music industry research variables of Familiarity, Passion, Burn and other variables of importance. Thus, subscribing record labels, radio stations and music retailers will be able to more accurately identify songs that are proven to be familiar to the listener and consumer. In addition, by using the comprehensive email retrieval system of the invention, subscribing record labels, radio stations, and music retailers will be able to communicate with specific, perfectly targeted music consumers. By generating and tabulating song research information, the invention can insure that subscribing labels provide music to stations that listeners want to hear, and as a result, music that the stations want the listeners to hear. Thus, listening time to that station will be maximized, and the goals and objectives of both record labels and radio stations will become more closely associated to the benefit of each.

The invention will make research information available to subscribing clients, which is not currently available, and will improve upon currently used research methods. The invention will greatly impact the business function areas of radio promotion, marketing, advertising and sales for the music industry, defined primarily as, but not limited to, record labels, radio stations, and music retailers. The research information for any song can be sorted by a number of variables including four demographic parameters: Age, Gender, Income, Education, and seven geographic parameters: Radio Station Listened To, Five Digit Zip Code, City, State, Region, Country including the selection of any one of over 240 Countries throughout the World, and The Entire World. Thus, the invention provides subscribing industry executives with the ability to sort and evaluate song research information on a very specific basis, or a general basis, by various demographic or geographic parameters, by radio station or on a market by market basis. Subscribing record labels will know specific markets where consumer response for a particular newly released song is positive. Subscribing radio stations will know that their listeners are familiar with, and want to hear that particular newly released song. Subscribing music retailers will be able to utilize this information to allocate product inventory accordingly. Best of all, since the invention operates dynamically, subscribing clients may access the information any time, day or night and will receive up to the minute information.

Of important note, via email campaigns, the invention will provide subscribing labels, radio stations, music retailers and consumer product companies with a direct communication channel to specific, perfectly targeted music consumers. The invention features a powerful email address retrieval system.

For subscribing record labels, the invention will be an effective tool that will provide information that will predict market response and assist in single and/or album launch preparation in all departmental areas that are critical to a successful single and/or album release. The invention will also be an effective tool to monitor a song as it moves through various life cycle stages. The invention will also be able to identify the point of diminishing returns, the point in time when, from a sales perspective, continued "heavy rotation" airplay may be detrimental to product sales. The invention also provides subscribing record labels with the ability to communicate with specific, perfectly targeted fans of specific artists. Like queries for the research information, queries for email addresses of site visitors can be narrow, such as a five digit zip code, or broad, such as the world or a music format, focused as required by the subscribing client, presenting enormous opportunities for marketing.

For subscribing radio stations, the invention will be an effective and comprehensive research tool, but more importantly, will provide the means for stations to interact in a cost effective manner and on a frequent basis with their P1 (Preference One) listeners. P1 listeners can be defined as someone that listens most frequently to that station. Based on information released in an industry study, it is believed the use of the invention by radio stations would enhance the relationship stations have with their listeners, building affinity and loyalty among listeners. The invention also provides stations with avenues to create "Non-Traditional" revenue streams, could increase advertising inventory, and could provide a "visual" advertising medium for on-air advertisers wishing to supplement their radio advertising efforts. The invention will be an effective couponing tool for a station's advertisers.

For subscribing music retailers, the invention will be an effective tool that will assist in inventory allocation, but as in the case of record labels and radio stations, will also provide retailers with the tool to interact with specific, perfectly targeted music consumers, confirmed customers of theirs or customers of competitors. The invention will be an effective couponing tool for retailers.

For consumer product advertisers that wish to reach perfectly targeted music consumers by any combination of demography, by specific artists and in as specific nature as a five-digit zip code, the invention will provide a new and unique method via a quality information database for reaching consumers.

BRIEF DESCRIPTION OF THE DRAWINGS

The invention will be better understood from the following description in conjunction with reference to the accompanying drawings in which.

DESCRIPTION OF THE PREFERRED EMBODIMENTS

Figure 1:
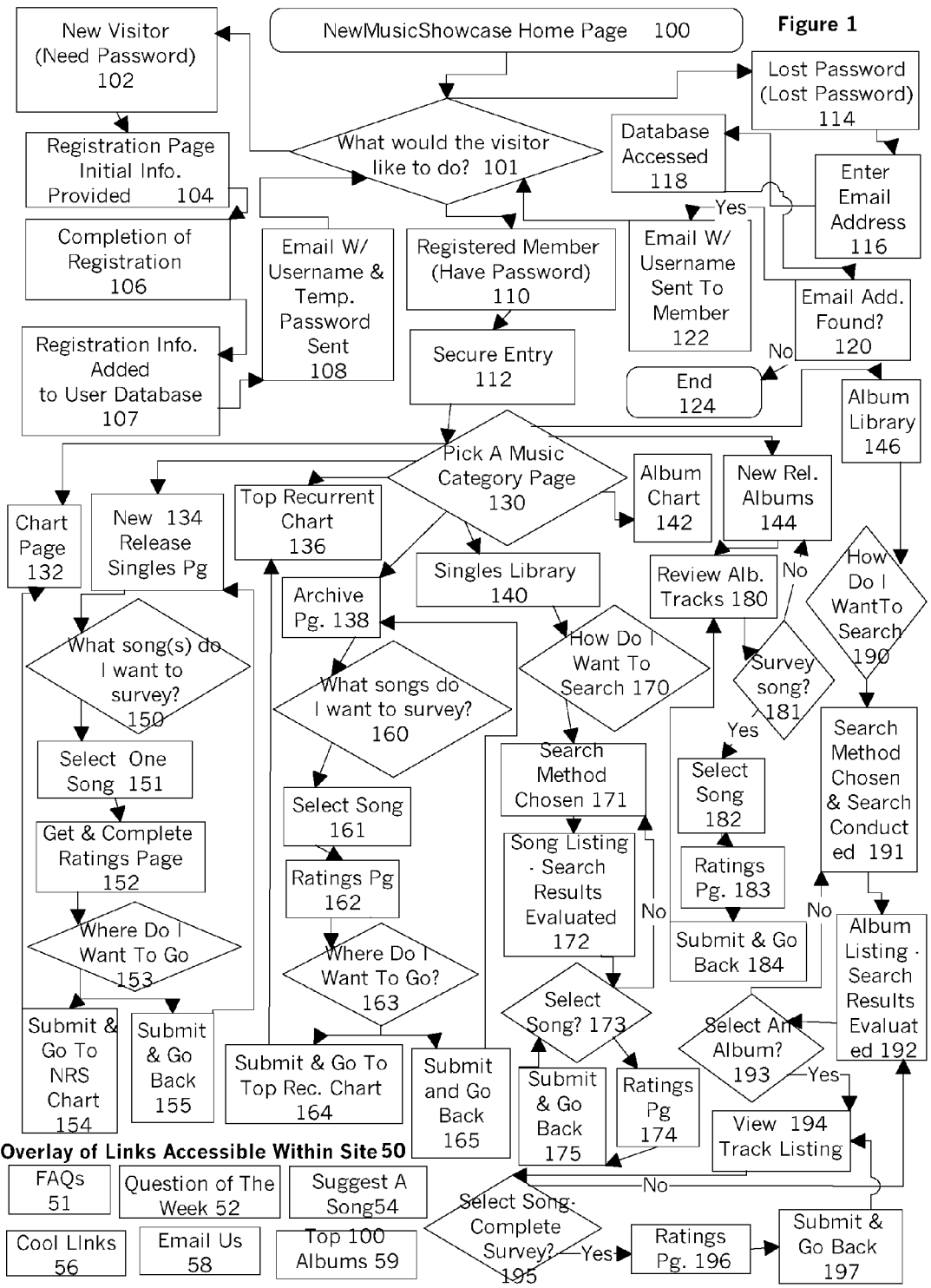
FIG. 1 is a flow chart diagram of the user interface representing the collection and gathering stages of the invention.

Referring to FIG. 1, a user interface home page 100 is shown as the initial point for a flow chart depicting the interaction of the user upon accessing the Internet site and its corresponding database. The home page 100, also known as a center of operation 100 or distribution point for users 100 who use the invention, provides access to various databases and channels for moving through the databases to perform various functions. From the home page 100, the user has three options and must decide 101 which is applicable to their current state of membership. The user can decide between entry as a registered user 110, recovering a lost password 114, or registering as a new user 102 if a state of membership does not exist. Membership provides access to the databases. Registration and Membership is required for access via a secure entry 112. The invention provides, a "Need Password" selection 102 whereby non-registered users will be able to secure Registered Member (RM) status. If a the user is a Registered Member and has a password, then user moves to "Have Password" 110. If the user is a Registered Member, but the user has "lost" their password information and are unable to access the site, then the user proceeds to the "Lost Password" selection 114. Each option will now be discussed in greater detail The new visitor section 102-108 describes the multiple stage registration process. Upon clicking on "Need Password" 102 the user is greeted with the Registration Page 104. Actual Registration is a two-stage process, 104 and 106. At the initial registration 104, the user or Music Consumer provides:

a) their Zip Code;
b) their Country (Country of Residence if outside the United States of America);
c) their Favorite Radio Format.

For "United States Registrants," clicking on a "Submit" icon during 104 results in the database system compiling a list of radio stations the individual could listen to based on the Zip Code and Radio Format entered on and leads the consumer to completion of registration 106. For "International Registrants," clicking on the Submit icon during initial registration 104 leads the consumer directly to completion of registration 106.

Completion of registration 106 describes the process required for the completion of the registration process. Included herein is the selection of a "Password," "Username," and the completion of the required demographic information by the registrant. Completion of registration 106 is a continuation of initial registration 104.

The information provided by the registrant in the initial registration 104 includes:

A. "Your Zip Code";
B. "Country";
C. "Favorite Format"

is shown or provided at the top of the completion of registration 106. The Music Consumer or user then provides: "User Name Desired", "Password for Name", "Verify Password", and "Email Address." The User Name can be any name of the registrants choice. The Password for Name can be any name of the registrants choice. The verify password step is for the Registrant to re-enter the Password chosen in "Password for Name." Finally, the Registrants are required to provide an Email Address. Registrants are limited to one Membership account per Email Address. Registrants have the option to "Check here if you would like to receive email notifying you of new releases, concert schedules, or other music and entertainment information." If the box is selected, the Music Consumer "opts-in", and upon completion of the completion of registration step 106, the user's Email Address is added to the "Opt-In" database. The use of the Opt-In database is discussed in greater detail in FIG. 3. If the Opt in box is not selected, the Music Consumer does not "opt-in" for the receipt of promotional email. Upon completion of the remainder of 106, they still become Registered Members, with full access to the site for participation purposes and music rating surveys. For United States Registrants, based upon the information provided on 104, when the registrant advances to this stage 106 of the registration process, the database has compiled a list of stations the registrant could listen to based upon their Zip Code and their Favorite Format, both as, once again, provided by the registrant on 104. At this stage of 106, a list of stations they could listen to is provided from which the Registrant is to select the station they listen to most often or is their favorite. This corresponds to the reference to P1 listeners above. In the event their station is not listed, the Registrant has the opportunity to list their station. In this event, that station is now added to a database of stations that correspond to the Zip Code indicated. For International Registrants, they may indicate the radio station that they listen in a box provided to the user.

Continuing in completion of registration 106, the Registrant selects the Gender, Age, Income and Education bracket that best reflects them for each variable. Upon completion of the Demographic Profile Information, the Registrant selects "Join." Their information is now added to the User Database 107. After the addition of the user information to the database 107, the consumer or user can expect to receive an "Introductory Email" 108 confirming their registration. This email contains a temporary password which must be used on the registrants first visit to activate the account. An example of this email is as follows:

"Thank you for joining NewMusicShowcase. Here is your Username and a temporary Password.

Username: sinatra

Temporary Password: qbt

You will validate your NewMusicShowcase membership by using your Username and the temporary Password on your first visit. On all future visits, you should use the Username and the Password you selected.

The password you selected is: dog

Please remember that both your Username and Password are case sensitive.

Please keep a copy of this email in a safe location for future reference. You can return to NewMusicShowcase:

http://www.newmusicshowcase.com

Thanks again,

NewMusicShowcase"

Upon receipt of the Introductory Email, the Registrant becomes a Registered Member and upon return to the decision point 100/101 can now choose "Have Password."

The lost password section includes elements 114-122 and describes the process for a Registered Member who has lost his/her password.

Registered members access site 100, 101 and select "Lost Password" 114 and receives an e-mail lost password message 116 as follows:

"Welcome to NewMusicShowcase Voter Assistance. Here you can enter the email address you signed up with and we will retrieve your user name and password and email it to you. If your email address has changed since you signed up with us, we recommend you re-register."

This allows the user to enter the email address used upon registration. User selects "Find"118 and communication with the User Database/Registered Member Database is made. The user does not see this. It is a "behind the scenes" operation. The user then gets the following notice 120 via the browser:

Address found? "If the email address was correct and found in our database, it has been sent to you and should arrive in your email shortly. Thank you.

If found, member receives a notification e-mail 120:

"Here is the information you requested.

Username: kennyo

Password: kennyo

Please remember that both user name and password are case sensitive.

Thank you

NewMusicShowcase

If the address was not found 124, then the party making the search query receives no notification and will need to re-register to obtain access.

The secure entry is provided through the registered member entry 110-112 which describes the process for entry for a Registered Member knowledgeable of their password who wishes to access the music databases. After accessing the site, 100 and 101, the Registered Member accesses the entry via Registered Member entry 110 and completes "Secure Entry" 112 to the song databases of the invention. The Secure Entry 112 requires the Username and Password information described in the registration process 106.

Successful entry of a Username and Password will lead the Registered Member (RM) to category selection 130.

Category selection 130 is a two function page. From category selection 130, Pick A Music Category, the RM views the Genre Format categories. The functions from category selection 130 are the selection of (1) a Genre Format Category and (2) a selection of a page within that Genre Format Category. Both are done on category selection 130. The Genre Format categories are:

1. A/C
2. Alternative
3. Christian
4. Classic Rock
5. Country
6. Jazz
7. Rock
8. Urban The RM decides which format is of interest, and then selects a database page from one of the formats. There are eight (8) pages within each Genre Format, with the exception of Classic Rock, which has four pages. The pages and their corresponding flow chart identification numbers are:

1. New Release Singles Chart—132
2. New Release Singles—134
3. Top Recurrent Chart—136
4. Archive—138
5. Singles Library—140
6. Album Chart—142
7. New Release Albums—144
8. Album Library—146

Additional Genre Formats of music may be added at any time. Classic Rock has only four pages because there are no new releases, however the format remains popular and therefore is an important segment to the music industry. We will now discuss each page.

The New Release Chart page 132 is a database page which ranks the top songs, as voted on by RMs. The New Release Chart page 132 is a numerical ordering of newly released singles or album tracks that have received the most votes. The New Release Chart page 132 does not provide any mechanism for the completion of a survey. Voting takes place via the New Release Singles page 134. The New Release Chart page 132 is dynamically created with each user request. Therefore, it is possible for the New Release Chart page 132 to reflect different point totals for a song when being viewed by two different individuals. This would occur if a vote were placed for the song after the first request for the page took place and then a subsequent request for the page by another individual. The New Release Chart page 132 has columns providing for the Current Week Chart Position (1-50), Points This Week, Chart Position Last Week, Chart Position Two Weeks previous, Top Position attained, and the Number of Weeks on the Chart. A "Buy" column also corresponds to each song and provides users with the opportunity to make a purchase. Included in the heading for the page there is also notice of the Week of the Year (i.e. Week of Jul. 24, 2000) and notice of the numerical week of the year, for example (30).

From the New Release Chart page 132 RMs can access any of the other database pages within the selected format, including New Release Singles Chart 132, New Release Singles 134, Top Recurrent Chart 136, Archive 138, Singles Library 140, Album Chart 142, New Release Albums 144, and Album Library 146.

Each are described in greater detail below. From the New Release Chart 132, RMs can access any of the Genre Format Specific Categories by returning to the category selection 130. From the New Release Chart page 132, RMs can access other pages within the invention, including the "FAQ" 51, "Question of the Week" 52, "Suggest A Song" 54, "Cool Links Page" 56, "Email Us" 58 or "Top 100 Album Page" 59. Songs that appear on the New Release Chart page 132 also appear in alphabetical order on the New Release Singles page 134. A RM, wishing to influence the chart position of a song that appears on the New Release Chart page 132, must access the New Release Singles page 134 and follow the process to complete a survey. The completion of a survey for songs that have accrued sufficient point totals and appear on the New Release Chart page 132 begins to take place via the New Release Singles page 134. To complete a survey, from the pick a category section 130 the Registered Member views the Genre Format categories and the various database pages available, and decides which database is of interest, and then selects a desired database (page) from one of the formats. In this instance, the user selects the New Release Singles page 134, which generates from the database an alphabetical listing of all songs with a song status of NRS. Song status is discussed in greater detail in FIG. 3. The New Release Singles page 134 also provides for a Vote column, a Points This Week Column and a Buy column. Included in the heading for the page, there is also notice of the Week of the Year (i.e. Week of Jul. 24, 2000) and notice of the numerical week of the year (30).

The invention provides for a new and unique dating system whereby songs are assigned a "Song Status" and based upon the song status and calendar dates, the song automatically moves through the databases of the invention and are accessible to users accordingly. Song Status is discussed in FIG. 3, however, a brief understanding is necessary here.

The movement of a song with a NRS status to other pages within the site and the corresponding automatic Song Status changes that take place is as follows:

Songs start at the New Release Singles Page 134 with a Song Status NRS and move to the Archive Page 138 with a Song Status ARC and finally to the Singles Library 140 with a Song Status SLI. The Archive and Singles Library pages are discussed more fully below. Typically, movement of a song to the next page in the aging process and the change of Song Status is an automatic process; based on the age of the song and the number of weeks it has appeared in a database.

Users have the ability to access a song survey via the New Release Singles page 134. Proceeding from the New Release Singles page 134 to the review of the database by the user, the user will be presented with a choice 150 and may select a song 152 from the database entry for evaluation, resulting in the Ratings Page 152, which is then completed by the user. A RM wishing to add their preference information to the information database and thereby influence the New Release Singles Chart must complete the Ratings Page 152.

The Ratings Page 152 is where consumers indicate their Familiarity, Passion and Burn for the song, and is designed to capture a wealth of other valuable consumer preference information. On the ratings page 152, the user is required to respond to three Category Variables. The required Category Variables are:

| | |
|---|---|
| 1. Familiarity | Are you familiar with this song? |
| 2. Passion | Do Like This Song? |
| 3. Burn | Are You Tired of This Song? |

For Familiarity and Passion, users indicate a "Yes" response by selecting from the Category Variable Level drop down box the level of Familiarity or Passion that best describes them. "Yes" Category Variable Levels are numerical, 1-10. For a "No" response, the Category Variable Levels are reasons why the response is "No."

The Burn question also requires the user to indicate a "Yes" response by selecting from the Category Variable Level drop down box a numerical level (1-10) that best describes them. However, if responding "Yes" to the Burn question, the user is also required to indicate a "Reason Why". Reasons for being tired are provided in a drop down box. This is a second Category Variable Level for the Burn question.

If the user is not tired of hearing the song, a "No" response is all that is required.

A song accumulates points by visitors expressing their numerical selections for the three category variables. Points will be accumulated and tabulated using the following formula:

(Familiarity)+(Passion)−(Burn)=Total points.

For example, a person indicating a 10 for both Familiarity and Passion and a 1 for Burn would generate for that song a point total of 19. The sum of all votes for this song would provide the Total Points accumulated.

The user has the opportunity to respond to other Category Variable questions also:
1. Do you Own This CD/Cassette?
2. Would You Like To Hear This Song on Your Station?
3. Where did you first hear this song?
4. Comments.

Below, the process is described more fully as the user completes 152 by responding to various Category Variable questions and indicates appropriate Category Variable Level (CVL) responses:
1. Familiarity: Yes or No If Yes, consumer selects the degree of familiarity on a scale of 1-10 with ten being the highest level of familiarity. 1-10 represents the CVL.

If no, the consumer selects a reason (a Category Variable Level) why they are not familiar with the song.

2. Passion: Yes or No

If Yes, the consumer selects the degree of Passion on a scale of 1-10 with ten being the highest level of Passion. 1-10 represents the CVL.

If no, the consumer selects a reason (a Category Variable Level) why they do not like the song.

3. Burn: Yes or No

If Yes, the consumer selects the degree of Burn on a scale of 1-10 with ten being the highest level of Burn. 1-10 represents the CVL. They also must indicate a reason (a Category Variable Level) for being tired of the song.

If no, the consumer selects the No entry. There is no CVL for a "any" response to Burn.

4. Do You Own CD/Cassette?

If yes, the consumer indicates the retailer from which the title was purchased. CVL is the name of the retailer where the product was purchased.

If no, the consumer indicates a reason why the selection has yet to be purchased. The CVL is the reason the product has yet to be purchased.

5. Would You Like To Hear This Song On Your Station?

If Yes, the consumer selects "Yes."

If No, the consumer selects "No."

There is/are no Category Variable Level(s) for this question.

6. Where Did You First Hear This Song?

Visitor selects Heard First medium from a "drop down" list of choices. The is Category Variable Level is the location or means that the user first heard the song.

7. Comments

Consumers may provide an unaided response or comment.

Figure 4:
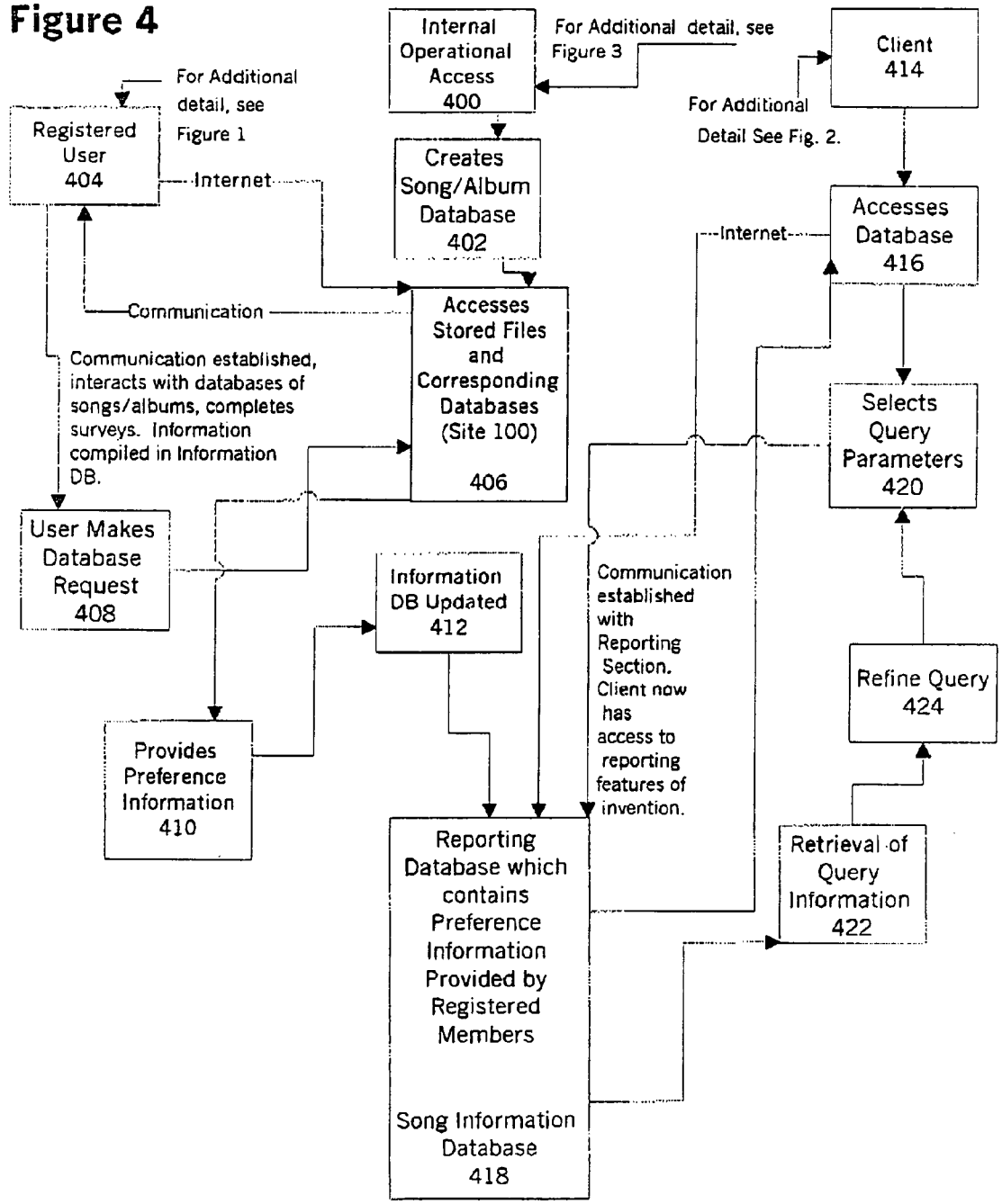
FIG. 4 is a flow chart diagram representing briefly the relationship between the elements shown in FIG. 1, FIG. 2 and FIG. 3.

The get and complete ratings page 152 is now complete and the user must decide 153 what option 154, 155 to select from, the return 155 to the new release singles page 134 or movement 154 to the database page of 132. Both result in updating the Song Information Database as shown in FIG. 4, 412. The New Release Singles Chart is updated to reflect the information provided by this respondent.

From the New Release Singles page 134, the song choice page 150, and the song selection page 151 RMs can access any of the other database pages within the selected music format, the New Release Singles Chart page 132, the Top Recurrent Chart page 136, the Archive page 138, the Singles Library page 140, the Album Chart page 142, the New Release Albums page 144, and the Album Library page 146. From the New Release Singles page 134, song choice page 150, and the song selection page 151 RMs can access any of the Format Specific Categories by returning to the category selection page 130. From the New Release Singles page 134, song choice page 150 and the song selection page 151, RMs can access other options within the invention, including the "FAQ" 51, "Question of the Week" 52, "Suggest A Song" 54, "Cool Links Page" 56, "Email Us" 58 or "Top 100 Album Page" 59. All are discussed in greater detail below.

The Top Recurrent Chart page 136 is a database page which features the top songs with an ARC Song Status, as voted on by RMs. The Top Recurrent Chart page 136 is a numerical ordering page, of songs that are older than 26 weeks (released more than 26 weeks ago), or are no longer being promoted by the record label, but have received enough votes from the Archive Page 138 to appear on the Top Recurrent Chart Page 136. The Top Recurrent Chart page 136 is dynamically generated with each user request. The Top Recurrent Chart page 136 has columns providing for the Current Week Chart Position (1-20), Points This Week, Chart Position Last Week, Chart Position Two Weeks previous, Top Position attained, and the Number of Weeks on the Chart. A "Buy" column also corresponds to each song and provides users with the opportunity to make a purchase. Included in the heading for the page, there is also notice of the Week Of the Year (i.e. Week of Jul. 24, 2000) and notice of the numerical week of the year (30). The Top Recurrent Chart page 136 does not provide for the submission of survey responses. The Top Recurrent Chart page 136 ranks, from 1-20, the top vote getting songs that have an ARC song status and appear on the Archive Page. Song Status is discussed more fully in FIG. 3, 360.

From the Top Recurrent Chart page 136, RMs can access any of the other database pages within the selected music format, the New Release Singles Chart page 132, the New Release Singles page 134, the Archive page 138, the Singles Library page 140, the Album Chart page 142, the New Release Albums page 144, and the Album Library page 146. From the Top Recurrent Chart page 136, RMs can access any of the Format Specific Categories by returning to category selection 130. From the Top Recurrent Chart page 136, RMs can access other options within the invention, including the "FAQ" 51, "Question of the Week" 52, "Suggest A Song" 54, "Cool Links Page" 56, "Email Us" 58 or "Top 100 Album Page" 59. All are discussed in greater detail below.

The Archive page 138 features songs that have been released more than 26 weeks prior to the current week period and/or songs that are less than 26 weeks old, but are no longer being actively promoted by the label, but still warrant radio play and music consumer support. The Archive page 138 also provides for a "Vote Column", a "Points This Week Column" and a "Buy Column." Included in the heading for the page, there is also notice of the Week Of the Year (i.e. Week of Jul. 24, 2000) and notice of the numerical week of the year (30). Proceeding from the Archive page 138 to the review of the database selection 160 by the user, the user may select a database entry 161 (song listing) for evaluation, resulting in a ratings page 162, which is then completed by the user. A RM wishing to add their preference information to the information database must complete the Ratings Page, 162. Votes for songs on the Archive Page 138 influence the Top Recurrent Chart Page 136. The Ratings Page 162 is where consumers indicate their Familiarity, Passion and Burn for the song, and is designed to capture a wealth of other valuable consumer preference information.

On the ratings page 162, the user is required to respond to three Category Variables. The required Category Variables are:

| | |
|---|---|
| 1. Familiarity | Are you familiar with this song? |
| 2. Passion | Do Like This Song? |
| 3. Burn | Are You Tired of This Song? |

To Familiarity and Passion, users indicate a "Yes" response by selecting from the Category Variable Level drop down box the level of Familiarity or Passion that best describes them. "Yes" Category Variable Levels are numerical, 1-10. For a "No" response, the Category Variable Levels are reasons why they response is "No."

The Burn question also requires the user to indicate a "Yes" response by selecting from the Category Variable Level drop down box a numerical level that best describes them. However, if responding "Yes" to the Burn question, the user is also required to indicate a "Reason Why". Reasons for being tired are provided in a drop down box. This is a second Category Variable Level for the Burn question.

If the user is not tired of hearing the song, a "No" response is all that is required.

The user has the opportunity to respond to other Category Variable questions also:

1. Do you Own This CD/Cassette?
2. Would You Like To Hear This Song on Your Station?
3. Where did you first hear this song?
4. Comments.

Below, the process is described more fully as the user completes the ratings page 162 by responding to various Category Variable questions and indicates appropriate Category Variable Level (CVL) responses:

Familiarity: Yes or No

If Yes, consumer selects the degree of familiarity on a scale of 1-10 with ten being the highest level of familiarity. 1-10 represents the CVL.

If No, the consumer selects a reason (a Category Variable Level) why they are not familiar with the song.

Passion: Yes or No

If Yes, the consumer selects the degree of Passion on a scale of 1-10 with ten being the highest level of Passion. 1-10 represents the CVL.

If No, the consumer selects a reason (a Category Variable Level) why they do not like the song.

Burn: Yes or No

If Yes, the consumer selects the degree of Burn on a scale of 1-10 with ten being the highest level of Burn. 1-10 represents the CVL. They also must indicate a reason (a Category Variable Level) for being tired of the song.

If No, the consumer selects the No entry. There is no CVL for a "No" response to Burn.

Do You Own CD/Cassette?

If Yes, the consumer indicates the retailer from which the title was purchased. CVL is the name of the retailer where the product was purchased.

If No, the consumer indicates a reason why the selection has yet to be purchased. The CVL is the reason the product has yet to be purchased. Would You Like To Hear This Song On Your Station?

If Yes, the consumer selects "Yes."

If No, the consumer selects "No."

There is/are no Category Variable Level(s) for this question.

Where Did You First Hear This Song?

Visitor selects Heard First medium from a "drop down" list of choices. The Category Variable Level is the location or means that the user first heard the song.

Comments

Consumers may provide an unaided response or comment.

The ratings page 162, is now complete and the user must decide 163 what option to select from, the return to the Archive page 138 or movement to the database page of the Top Recurrent Chart page 136. These are illustrated on the flow chart in submit and go back 165 and submit and go to top record chart 164, respectively. Both result in updating the Song Information Database FIG. 4. The Top Recurrent Chart is also updated.

From the Archive page 138, the song listing page 160, and the song selection page 161, RMs can access any of the other database pages within the selected music format, these being the New Release Singles Chart page 132, the New Release Singles page 134, the Top Recurrent Chart page 136, the Singles Library page 140, the Album Chart page 142, the New Release Albums page 144, and the Album Library page 146. From the Archive page 138, RMs can access any of the Format Specific Categories by returning to the category selection 130. From the Archive page 138, the song listing page 160, and the song selection page 161, RMs can access other options within the invention, including the "FAQ" 51, "Question of the Week" 52, "Suggest A Song" 54, "Cool Links Page" 56, "Email Us" 58 or "Top 100 Album Page" 59. All are discussed in greater detail below.

The Singles Library page 140 provides users with access to a database and serves as a search engine for songs that have been listed on the site for more than 52 weeks. Songs available in the Singles Library have a song status of "SLI". These songs have passed through the New Release Singles 134 (NRS) stage and the Archive stage 138 (ARC). Once a search is complete, RMs may vote for the song, however, there is no charting mechanism in place for these songs because of their age. However, survey information is collected and stored in the Information Database of the invention. The Singles Library page 140 provides for three possible search criteria:

At the search selection page 170, the user must decide from the Search Selection choices of 1. Song Title;
2. Artist or
3. Album.

Each search mechanism will now be discussed briefly.

1. Song Title

RMs desiring to search by "Song Title" provide a single word of the title, or a sequential combination of words in the title and then click on "Search." A minimum of three letters is required. All songs in the Song/Album Database with the letters, word or words indicated in the search will result.

2. Artist

RMs desiring to search by "Artist Name" provide a minimum of three letters of either the first or last name of the artist and then click on "Search." The system will then provide a listing of all artists with either a first or last name beginning with the letters indicated in the Song/Album Database.

3. Label

RMs desiring to search by record "Label" provide the name of the label and then click on "Search." The system will then provide a listing of all songs in the Song/Album Database on that record "label."

After making a search method choice 171, and enterting the search words, the user will review the search results, 172.

Regardless of which search process is employed, a song listing will result. The user must then decide 173 what it is they wish to do. The user then has two main options:

1. The user can select a song and has the opportunity to complete a song survey. This is detailed by the user moving to the ratings page 174 or;
2. The user can, by using their "back button" return to the Search Method 171.

In the ratings page 174, the user is required to respond to three Category Variables. The required Category Variables are:

| 1. Familiarity - | Are you familiar with this song? |
| 2. Passion - | Do Like This Song? |
| 3. Burn - | Are You Tired of This Song? |

To Familiarity and Passion, users indicate a "Yes" response by selecting from the Category Variable Level drop down box the level of Familiarity or Passion that best describes them. "Yes" Category Variable Levels are numerical, 1-10. For a "No" response, the Category Variable Levels are reasons why they response is "No."

The Burn question also requires the user to indicate a "Yes" response by selecting from the Category Variable Level drop down box a numerical level that best describes them. However, if responding "Yes" to the Burn question, the user is also required to indicate a "Reason Why". Reasons for being tired are provided in a drop down box. This is a second Category Variable Level for the Burn question.

If the user is not tired of hearing the song, a "No" response is all that is required.

The user has the opportunity to respond to other Category Variable questions also:

1. Do you Own This CD/Cassette?

2. Would You Like To Hear This Song on Your Station?

3. Where did you first hear this song?

4. Comments.

The process is described more fully as the user completes the ratings page 174 by responding to various Category Variable questions and indicates appropriate Category Variable Level (CVL) responses:

Familiarity: Yes or No

If Yes, consumer selects the degree of familiarity on a scale of 1-10 with ten being the highest level of familiarity. 1-10 represents the CVL.

If No, the consumer selects a reason (a Category Variable Level) why they are not familiar with the song.

Passion: Yes or No

If Yes, the consumer selects the degree of Passion on a scale of 1-10 with ten being the highest level of Passion. 1-10 represents the CVL.

If No, the consumer selects a reason (a Category Variable Level) why they do not like the song.

Burn: Yes or No

If Yes, the consumer selects the degree of Burn on a scale of 1-10 with ten being the highest level of Burn. 1-10 represents the CVL. They also must indicate a reason (a Category Variable Level) for being tired of the song.

If No, the consumer selects the No entry. There is no CVL for a "No" response to Burn.

Do You Own CD/Cassette?

If Yes, the consumer indicates the retailer from which the title was purchased. The retailer is the CVL.

If No, the consumer indicates a reason why the selection has yet to be purchased. The reason the product has not been purchased is the CVL.

Would You Like To Hear This Song On Your Station?

If Yes, the consumer selects "Yes."

If No, the consumer selects "No."

There is/are no Category Variable Level(s) for this question.

Where Did You First Hear This Song?

Visitor selects Heard First medium from a "drop down" list of choices. The Category Variable Level is the location or means that the user first heard the song.

Comments

Consumers may provide an unaided response or comment.

The ratings page 174 is now complete and the user must select to submit and go back 175 and return to the song selection page 173 where the user has the opportunity to select another song from the search results. Although there is no charting mechanism in place, the completion of the survey results in updating the Song Information Database FIG. 4.

From the Singles Library page 140, the search selection page 170, the search method page 171 and the song selection page 173, RMs can access any of the other database pages within the selected music format, the New Release Singles Chart page 132, the New Release Singles page 134, the Top Recurrent Chart page 136, the Archive page 138, the Album Chart page 142, the New Release Albums page 144, and the Album Library page 146. From the Singles Library page 140, the search selection page 170, the search method page 171 and the song selection page 173, RMs can access any of the Format Specific Categories by returning to the category selection page 130. From the Singles Library page 140, the search selection page 170, the search method page 171 and the song selection page 173, RMs can access other options within the invention, including the "FAQ" 51, "Question of the Week" 52, "Suggest A Song" 54, "Cool Links Page" 56, "Email Us" 58 or "Top 100 Album Page" 59. All are discussed in greater detail below The New Release Album Chart page 142 provides access to a dynamically created database featuring the top albums, as voted on by RMs. The New Release Album Chart is dynamically created upon the request for the page by the user and is a numerical ordering of newly released albums that have received the most votes by RMs. The "Album" points total is the sum of the points for each song on the album. The New Release Album Chart Page 142 does not provide for any links providing for Registered Members to complete a survey on a song or songs.

From the Album Chart page 142 RMs can access any of the other database pages within the selected music format, the New Release Singles Chart page 132, the New Release Singles page 134, the Top Recurrent Chart page 136, the Archive page 138, the Singles Library page 140, the New Release Albums page 144, the Album Library page 146. From the Album Chart page 142, RMs can access any of the Format Specific Categories by returning to the category selection page 130. From the Album Chart page 142, RMs can access other options within the invention, including the "FAQ" 51, "Question of the Week" 52, "Suggest A Song" 54, "Cool Links Page" 56, "Email Us" 58 or "Top 100 Album Page" 59. All are discussed in greater detail below.

The New Release Albums page 144 provides access to a database that will create dynamically a listing of albums that have been released within the most recent 52 week period and/or that are older than 52 weeks but continue to receive promotional support from the label. These albums have a status of NRA. The New Release Albums page 144 is not a Voting Page. Albums are listed in alphabetical order by the first name of the artist. Proceeding from the New Release Albums page 144, a user has the opportunity to review the songs on any album listed on the New Release Albums page 144 by "clicking" on the album title, receiving the review albums tracks page 180, a New Release Album Track Listing. Once the "track listing" on the review albums tracks page 180 has been accessed, the Registered Member decides 181 if they would like to complete a survey on any song or songs from that album. This is accomplished by proceeding from the review albums tracks page 180 through the decision making process of 181 to the selection of the song 182 to the Ratings Page, 183.

From the New Release Albums page 144, the review albums tracks page 180, the survey song page 181, and the select song page 182, RMs can access any of the other database pages within the selected music format, the New Release Singles Chart page 132, the New Release Singles page 134, the Top Recurrent Chart page 136, the Archive page 138, the Singles Library page 140, the Album Chart page 142, and the Album Library page 146. From the survey song page 181, and the select song page 182, RMs can access any of the Format Specific Categories by returning to the category selection page 130. From the New Release Albums page 144, the review albums tracks page 180, the survey song page 181, and the select song page 182, RMs can access other options within the invention, including the "FAQ" 51, "Question of the Week" 52, "Suggest A Song" 54, "Cool Links Page" 56, "Email Us" 58 or "Top 100 Album Page" 59. All are discussed in greater detail below The New Release Album Track Listing Ratings Page 183 is the mechanism whereby consumers indicate their Familiarity, Passion and Burn for the song from a New Release Album, and is designed to capture a wealth of other valuable consumer preference information.

On the New Release Album Track Listing Ratings Page 183, the user is required to respond to three Category Variables. The required Category Variables are:

| 1. Familiarity | Are you familiar with this song? |
| 2. Passion | Do Like This Song? |
| 3. Burn | Are You Tired of This Song? |

To Familiarity and Passion, users indicate a "Yes" response by selecting from the Category Variable Level drop down box the level of Familiarity or Passion that best describes them. "Yes" Category Variable Levels are numerical, 1-10. For a "No" response, the Category Variable Levels are reasons why they response is "No."

The Burn question also requires the user to indicate a "Yes" response by selecting from the Category Variable Level drop down box a numerical level that best describes them. However, if responding "Yes" to the Burn question, the user is also required to indicate a "Reason Why". Reasons for being tired are provided in a drop down box. This is a second Category Variable Level for the Burn question.

If the user is not tired of hearing the song, a "No" response is all that is required.

The user has the opportunity to respond to other Category Variable questions also:

1. Do you Own This CD/Cassette?
2. Would You Like To Hear This Song on Your Station?
3. Where did you first hear this song?
4. Comments.

Below, the process is described more fully as the user completes the New Release Album Track Listing Ratings Page 183 by responding to various Category Variable questions and indicates appropriate Category Variable Level (CVL) responses:

Familiarity: Yes or No
 If Yes, consumer selects the degree of familiarity on a scale of 1-10 with ten being the highest level of familiarity. 1-10 represents the CVL.
 If No, the consumer selects a reason (a Category Variable Level) why they are not familiar with the song.

Passion: Yes or No
 If Yes, the consumer selects the degree of Passion on a scale of 1-10 with ten being the highest level of Passion. 1-10 represents the CVL.
 If No, the consumer selects a reason (a Category Variable Level) why they do not like the song.

Burn: Yes or No
 If Yes, the consumer selects the degree of Burn on a scale of 1-10 with ten being the highest level of Burn. 1-10 represents the CVL. They also must indicate a reason (a second Category Variable Level) for being tired of the song.
 If No, the consumer selects the No entry. There is no CVL for a "No" response to Burn.

Do You Own CD/Cassette?
 If Yes, the consumer indicates the retailer from which the title was purchased. CVL is the name of the retailer where the product was purchased.
 If No, the consumer indicates a reason why the selection has yet to be purchased. The CVL is the reason the product has yet to be purchased.

Would You Like To Hear This Song On Your Station?
 If Yes, the consumer selects "Yes."
 If No, the consumer selects "No."

There is/are no Category Variable Level(s) for this question.

Where Did You First Hear This Song?
 Visitor selects Heard First medium from a "drop down" list of choices. The Category Variable Level is the location or means that the user first heard the song.

Comments
 Consumers may provide an unaided response or comment.

The submit and go back selection 184 occurs upon the completion of the New Release Album Track Listing Ratings Page 183, and the user returns to the Review album tracks page 180, where they have the opportunity to complete another survey, or advance to other database pages as discussed previously. The Information Database is updated.

The Album Library page 146 serves as a search engine for albums that have been listed on the site for more than 52 weeks. In the event the label has decided to cease promotion of an album prior to the expiration of 52 weeks from the date of its release, the album will also be listed in the Album Library. These albums have passed through the New Release Album 144 stage, where they had an Album Status of NRA. They now have an Album Status of ALI. Once a search for an album is complete, RMs may vote for a song from an album; however, there is no charting mechanism in place for these songs because of the age of these songs/albums. However, survey information is collected and stored in the Information Database of the invention and can be accessed by clients. In search selection page 190, the user must decide from the Search Selection choices of:

1. Album Title
2. Artist
3. Label

In the Album Library page 146, the user makes the search selection from a "drop down" box listing each choice. Each search mechanism will now be discussed briefly.

1. Album Title

RMs desiring to search by "Album Title" provide a single word of the title, or a combination of words in the title and then click on "Search." All albums in the Song/Album Database with the word or words indicated in the search will result.

2. Artist

RMs desiring to search by "Artist Name" provide a minimum of three letters of either the first or last name of the artist and then click on "Search." The system will then provide a listing of all artists with either a first or last name beginning with the letters indicated in the Song/Album Database.

3. Label

RMs desiring to search by record "Label" provide the name of the label and then click on "Search." The system will then provide a listing of all albums in the Song/Album Database on that record "label."

After making a search method choice 190 and conducting the search 191, the user will review the search results 192.

Regardless of which search process is employed, an album listing 192 will result. The user must then decide what it is they wish to do. The user then has two main options:

1. The user can select an album 193 and then has the opportunity to view a track listing 194 for that album; or 2. The user can, by using their "back button" return to the Search Method 191 where they can complete another search, should they like.

From search method choice 190, conducting the search 191, album listing 192, select an album 193, view a track listing 194 and complete survey 195, RMs can access any of the other database pages within the selected music format, the New Release Singles Chart page 132, the New Release Singles page 134, the Top Recurrent Chart page 136, the Archive page 138, the Singles Library page 140, the Album Chart page 142, the New Release Albums page 144 and the Album Library page 146. From the Album Library page 146, RMs can access any of the Format Specific Categories by returning to 130. From search method choice 190, conducting the search 191, album listing 192, select an album 193, view a track listing 194 and complete survey 195, RMs can access other options within the invention, including the "FAQ" 51, "Question of the Week" 52, "Suggest A Song" 54, "Cool Links Page" 56, "Email Us" 58 or "Top 100 Album Page" 59. All are discussed in greater detail below.

The user, having selected an album 193 proceeds to view the track listing 194 where they must decide if they would like to complete a song survey. This decision takes place at a song selection 195. If No, the user returns to the album listing 192. If Yes, the user proceeds to the ratings page 196.

The New Release Album Track Listing Ratings Page 196 is the mechanism whereby consumers indicate their Familiarity, Passion and Burn for the song from a New Release Album, and is designed to capture a wealth of other valuable consumer preference information.

On the New Release Album Track Listing Ratings Page 196, the user is required to respond to three Category Variables. The required Category Variables are:

| | | |
|---|---|---|
| 1. Familiarity | Are you familiar with this song? |
| 2. Passion | Do Like This Song? |
| 3. Burn | Are You Tired of This Song? |

To Familiarity and Passion, users indicate a "Yes" response by selecting from the Category Variable Level drop down box the level of Familiarity or Passion that best describes them. "Yes" Category Variable Levels are numerical, 1-10. For a "No" response, the Category Variable Levels are reasons why they response is "No."

The Burn question also requires the user to indicate a "Yes" response by selecting from the Category Variable Level drop down box a numerical level that best describes them. However, if responding "Yes" to the Burn question, the user is also required to indicate a "Reason Why". Reasons for being tired are provided in a drop down box. This is a second Category Variable Level for the Burn question.

If the user is not tired of hearing the song, a "No" response is all that is required.

The user has the opportunity to respond to other Category Variable questions also:

1. Do you Own This CD/Cassette?

2. Would You Like To Hear This Song on Your Station?

3. Where did you first hear this song?

4. Comments.

Below, the process is described more fully as the user completes the ratings 196 by responding to various Category Variable questions and indicates appropriate Category Variable Level (CVL) responses:

Familiarity: Yes or No

If Yes, consumer selects the degree of familiarity on a scale of 1-10 with ten being the highest level of familiarity. 1-10 represents the CVL.

If No, the consumer selects a reason (a Category Variable Level) why they are not familiar with the song.

Passion: Yes or No

If Yes, the consumer selects the degree of Passion on a scale of 1-10 with ten being the highest level of Passion. 1-10 represents the CVL.

If No, the consumer selects a reason (a Category Variable Level) why they do not like the song.

Burn: Yes or No

If Yes, the consumer selects the degree of Burn on a scale of 1-10 with ten being the highest level of Burn. 1-10 represents the CVL. They also must indicate a reason (a second Category Variable Level) for being tired of the song.

If No, the consumer selects the No entry. There is no CVL for a "No" response to Burn.

Do You Own CD/Cassette?

If Yes, the consumer indicates the retailer from which the title was purchased. CVL is the name of the retailer where the product was purchased.

If No, the consumer indicates a reason why the selection has yet to be purchased. The CVL is the reason the product has yet to be purchased.

Would You Like To Hear This Song On Your Station?

If Yes, the consumer selects "Yes."

If No, the consumer selects "No."

There is/are no Category Variable Level(s) for this question.

Where Did You First Hear This Song?

Visitor selects Heard First medium from a "drop down" list of choices. The Category Variable Level is the location or means that the user first heard the song.

Comments

Consumers may provide an unaided response or comment.

Submit and go back 197 occurs upon the completion of the New Release Album Track Listing Ratings Page 196, and the user returns to view the track listings 194. The Information Database is updated.

In the lower left corner of FIG. 1, there is the Overlay of Links. These serve as an additional communicative and informative mechanism. Here is a brief description of each:

FAQ 51—Frequently Asked Questions. Provides users with answers to questions asked often;

Question of The Week 52: A general question is asked each week. An unaided response question, users can respond if they like;

Suggest A Song 54—has been designed so that users can inform Administrative personnel of songs that they would like to see listed;

Cool Links 56—a page for links to other sites that are of interest to music consumers;

Email Us 58—a general question email function so users have a direct line Administrative personnel;

Top 100 Album Chart 59—provides a numerical ranking of the Top 100 Albums, without regard for Genre Format.

Figure 2:
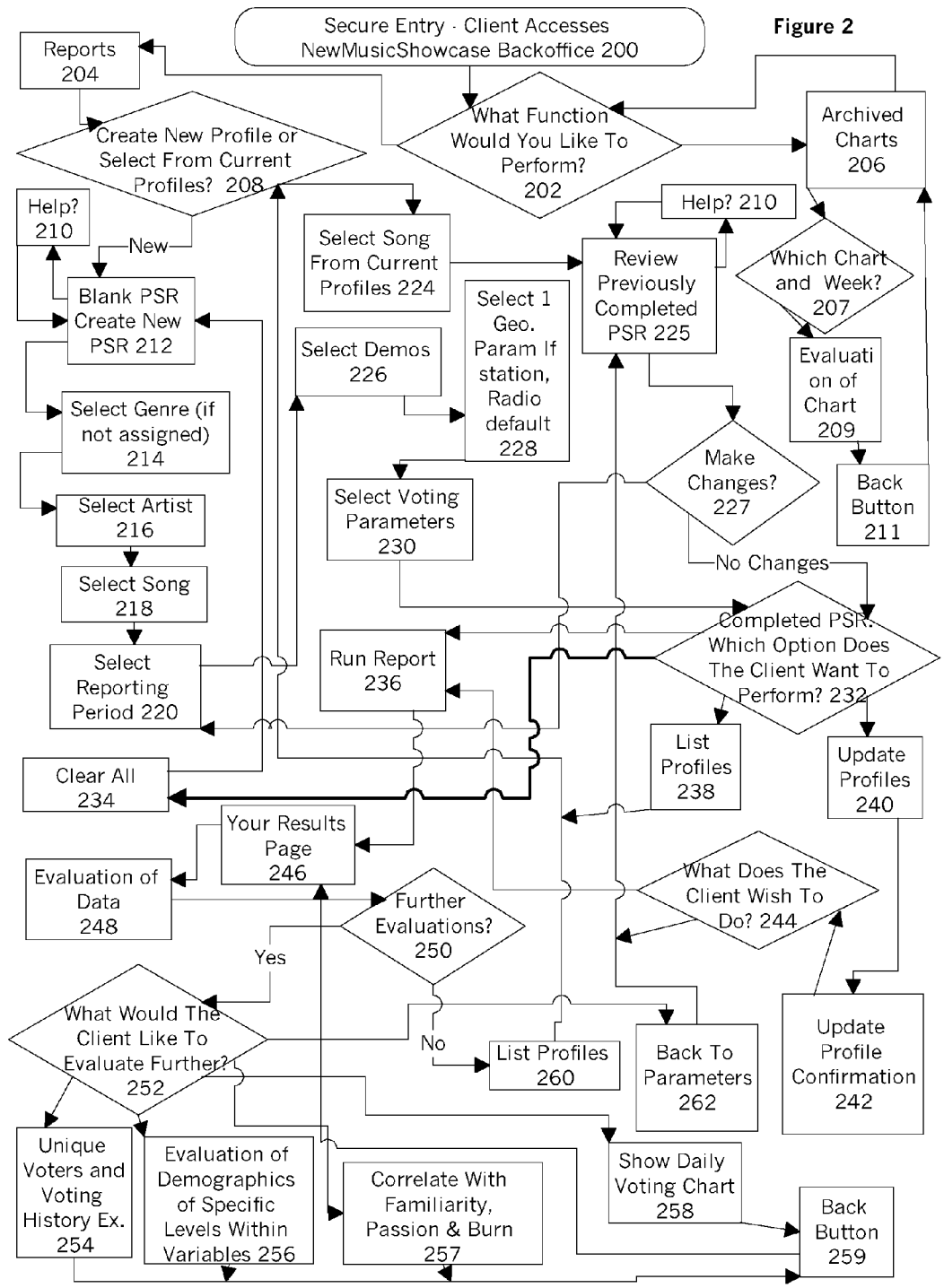
FIG. 2 is a flow chart diagram of the client interface representing the sorting and reporting stages of the invention.

Referring to FIG. 2, a flow chart diagram is shown representing the sorting and reporting stages of the invention which represents the client interface with the information database. Beginning with the secure entry 200, the client accesses the Backoffice Reporting Section of the invention. The Secure Entry 200 requires the Subscriber Name and Password information which was provided to the client and is an Administrative function and which has been issued in FIG. 3, 450.

Upon entry, the client must decide what function to perform 202. There are two choices:

1. Reports 204
2. Archived Chart History 206

When selecting Reports 204, the client proceeds to create a new profile or select from the current profiles 208. This profile selection 208 serves a dual purpose:

1. As an avenue to Create New Profile 210-220;

2. As a listing of songs researched previously where the client committed the song to the List Profiles 224 et seq.

Each will now be discussed in detail.

1. As an avenue to Create New Profile

Assuming a new client accessing the Backoffice Reporting Section for the first time and has proceeded to creating or selecting a profile 208, the client would proceed to a Blank Parameter Selection Report 212.

The Parameter Selection Report (PSR) 212 is used by subscribing clients to query the database for the retrieval of information pertaining to specific demographic, geographic and voting criteria as they relate to a specific song. A "Help" function 210 is available to assist researchers in completion of the Parameter Selection Report.

Before outlining the process for the completion of the PSR 212, it will be helpful to discuss briefly, the various Account Types available. The possible Account Types are:

1. Record Label
2. Radio
3. Retailer

The "Password" issued to a client for access via the Secure Entry 200 is dependent upon the type of client. The "Password" identifies the "Account Type" of the Subscriber. Based on the password, the system will be able to identify the client upon entry to the Backoffice Reporting Section of the invention. There are varying degrees of information available to subscribers depending upon their Account Type. Issuance of Subscriber Account Type and corresponding Passwords is discussed in greater detail in FIG. 3.

Briefly, access to information limitations are implemented as follows:

The Genre/Format that a client has access to and may select for evaluation is tied to their Account Type—which is defined by the password. As discussed in FIG. 3 of the invention, songs entered into the Song/Album Database are assigned a SID (Song Identification Number) which identifies the Genre/Format and the album on which the song may be found. It is the combination of an Account Type Password and the SID that allows the system to limit the information that may be retrieved. SID is discussed in FIG. 3, 360.

Record Label Sample Password: "CO-MCA." Labels may access information as it pertains only to their specific label and format. For example, MCA's country division, MCA Nashville, can access only MCA Nashville product, or database entries that have a Song Identification Number (SID) beginning with CO-MCA, where CO identifies "Country" and "MCA" identifies the label as MCA. MCA Nashville cannot access any song information of a competing record label or music released by a non country division of MCA—for example, AC-MCA. When a record label accesses the database and begins to complete a Parameter Selection Report, the Genre selection defaults to the Genre established by the password.

Radio Stations Sample Password: "CO-WSIX." Radio stations are limited to music of their genre/format, but can access all song information within their genre/format, identified in this example by the "CO", in the password. "Country" radio passwords will provide a station with access to songs that have a SID beginning with a "CO." For example, a SID of CO-MCA-11482-1 would be accessible to a Country radio station.

If research client accessing the database is a Radio Station, the Radio Station Geographic search parameter is "fixed" to the station that is accessing the database, which is also identified in the Password, in this example, WSIX.

Retailer: The Retailer has the most access provided to a client. A Retailer will have access to all song information, regardless of Song Identification Numbers, Record Label or Radio Station.

Proceeding from creating a new PSR 212 to selecting a genre 214, the client begins to complete the Parameter Selection Report (PSR). In the PSR, the client can select the parameter(s) by which they wish to query the database by clicking on the appropriate categories, or they may blick for help 210 for more instructions.

1. Select Genre 214 a. Defaults based on Password of Client if Radio Station or Record Label;

b. Retailer selects Genre Format from Drop Down Box.

2. Select Artist 216 a. Client types the name of the artist in "Artist List" box.

b. Client "clicks" on "Artist List."

c. Client confirms name of artist by selecting the artist from the list of artists generated.

3. Select Song 218
   a. Client types name of song or partial song title in the "Song List" box;
   b. Client clicks on "Song List";
   c. Client confirms song by selecting song from the list of songs generated.

4. Select Reporting Period 220
   a. Client moves to the "Report Period" section and selects a "Report Period" beginning date;
   b. Client selects a "Report Ending" date.

Client can select:
   1. The most recent 183 day period, inclusive of the current date as the "Report Ending" date;
   2. Any consecutive dates within the 183 day period, inclusive of the current date as the "Report Ending" date;
   3. Any single day within the 183 day period, inclusive of the current date as the "Report Ending" date.

5. Select Demographic Parameters 226
   Queries may be made for a specific Gender, Age, Income and Education parameter, a combination of parameters within each parameter category, or the query may be made for all brackets within each parameter category.

6. Select Geographic Parameter 228
   Client Selects One Geographic Parameter such as radio station, zip code, city, state, region, country, universe or the like.

Radio Station
   If research client accessing the database is a Radio Station, the Radio Station Parameter is "fixed" to the station that is accessing the database. Therefore, radio stations may not query the database by the call letters of another station. Radio stations may not query the database for respondents that are registered under a different station. If selected, the Radio Station parameter will provide only information submitted by individuals that (1) completed a survey for the song indicated in the Song List box and (2) individuals who indicated the station in the Radio Station List box as their station of choice when the individual registered. Once again, a radio station cannot evaluate specifically the information submitted by listeners of another radio station using the Radio Station Geographic Parameter. If a radio station is accessing the reporting section of the invention, The Geographic Parameter—Radio Station defaults to the station accessing the database.

If client has access to the full list of stations (retailers or record labels), they may type the call letters of the station for which they wish to query the database, must click on "Call List" and then confirm the station from the list of stations generated.

If client has access to the full list of stations (retailers or record labels), they may select more than one station.

Zip Code:
   If selected, will provide information (1) as submitted by individuals that indicated that Zip Code when the individual registered FIG. 1, 104 and (2) have voted for the song indicated in the Song List Box.

Client must type at least the first number of the zip code for which they wish to query the database in the Zip Code box and then confirm the Zip Code from the list of Zip Codes generated.

The client may select more than one Zip Code from the list generated.

City:
   The major metropolitan areas of the United States have been defined as being comprised of zip codes surrounding the city. Similar to the Standard Metropolitan Statistical Areas (SMSA). Zip codes surrounding each city have been grouped and defined as that city.

If selected, will provide information as submitted by all individuals (1) whose Zip Codes fall within the Zip Codes that have been assigned to the City selected by the client and (2) who have completed a survey for the song listed in the Song List box.

A single specific United States city may be selected, exclusive of other United States cities, or multiple United States cities may be selected, exclusive of other United States cities.

State: If selected, will provide research information as submitted by (1) individuals that live in the state selected and (2) have completed a survey for the song listed in the Song List box.

A single state may be selected, exclusive of all other states of the United States.

Region: If selected, will provide research information as submitted by (1) individuals that reside in that region of the United States and (2) have completed a survey for the song listed in the Song List box. Regions are the generally accepted regions used by labels in radio promotion.

Country: If selected, will provide research information as submitted by (1) individuals that reside in the Country selected and (2) have completed a song survey for the song listed in the Song List box. There are over 240 Countries available for selection by a subscribing client.

Universe: If selected, will provide research information as submitted by every Registered Member that has completed a song survey for the song listed in the Song List box, regardless of geographic location of the respondent.

7. Voting Parameters 230
   The system defaults to selecting "Yes" for each of the Category Variables and Category Variable Levels described in FIG. 1. Clients may "de-select" any of these variables for which they may not be interested in evaluating. A description of the Category Variables and Category Variable Levels from a research perspective follows:

1. Familiarity:
   Selection of a Yes will provide the total number of Yes responses. Selection of a Yes will also result in providing a breakdown, by each CVL, (the degrees of Familiarity 1-10), the number of submissions each degree received (1-10 as appears on the Ratings Page), as submitted by visitors that meet the demographic and geographic parameters selected by the client.

Selection of a No will provide the total number of No responses. Selection of a No will also result in providing a numerical breakdown for each possible reason for a No response (the CVL) as submitted by visitors that match the demographic and geographic parameters selected by the client. No does not mean that the client does not want to query the database for Familiarity.

2. Passion:
   Selection of a Yes will provide the total number of Yes responses. Selection of a Yes will also result in providing a breakdown, by each CVL (the degrees of Passion 1-10), the number of submissions each degree of Passion received (1-10 as appears on the Ratings Page), as submitted by visitors that meet the demographic and geographic parameters selected by the client.

Selection of a No will provide the total number of No responses, but will also provide a breakdown for each possible No response (the CVL) as submitted by visitors that meet the demographic and geographic parameters selected by the client. No does not mean that the client does not want to query the database for Passion.

3. Burn:

Selection of a Yes will provide the total number of Yes responses. Selection of a Yes will also provide a breakdown, by each CVL (the degrees of Burn 1-10), the number of submissions for each degree of Burn received (1-10 as appears on the Ratings Page), as submitted by visitors that meet the demographic and geographic parameters selected by the client. In addition, selection of a "Yes-I am tired of a song," requires a reason why. This is the second CVL for the Burn question. There is also a breakdown, by each reason, indicating the number of individuals selecting each possible response for being tired.

Selection of a No will provide the total number of individuals that meet the demographic and geographic parameters selected, that submitted a "No"—I Am Not Tired of This Song-to this question. No does not mean that the client does not want to query the database for Burn.

4. Would You Like To Hear This Song On Your Station:

Selection of a Yes will provide the total number of people that meet the demographic and geographic parameters selected, who have checked Yes to this question. Selection of a No will provide the total number of people that meet the demographic and geographic parameters selected, who have checked No to this question. A No on the Ratings Page is the equivalent of saying I don't want to request this song. On the Parameter Selection Report, a "No" does not mean that the client does not want to query the database for Total requests for this song.

5. Own CD results:

Selection of a Yes:

The Yes will provide the total number of people that meet the demographic and geographic parameters selected, who have indicated that they own the CD. A second query available with the Yes selection is whether or not the client would like to evaluate where, at what retailer, those purchases were made. Selection of "Purchased Where" provides a listing of the retailers, with the number of times that retailer was selected, as submitted by people that meet the demographic and geographic parameters selected. This is the CVL for a "Yes" response to Own CD. Selection of a No: The "No" provides the total number of people who have indicated that they do not own the CD, that meet the demographic and geographic parameters selected. A second query available with the No selection is whether or not the client would like to evaluate why the CD hasn't been purchased. Selection of "Why Not" provides a listing of the reasons the CD has not been purchased by those that meet the demographic and geographic parameters selected. This is the CVL for a "No" response to Own CD.

6. Heard First:

A selection of Yes will provide the client with a total for each of the possible Heard First selections on the Ratings Page, as submitted by individuals that meet the demographic and geographic parameters selected. A selection of No is an indication that the client is not interested in receiving this information.

7. Read Comments:

A Selection of Yes will provide in individual paragraphs all of the comments as submitted by people that meet the demographic and geographic parameters selected. A selection of No is an indication that the client is not interested in receiving this information.

As an example, the Parameter Selection Report has been completed 232 as follows and the Information Database will be queried accordingly, if the client elects to run the report:

| | |
|---|---|
| Genre: | Country |
| Artist: | Michael Peterson |
| Song: | Sure Feels Real Good |
| Report Period: | Sep. 1, 1999 through Sep. 30, 1999 |
| Gender: | Both Male and Female |
| Age: | All Age Brackets |
| Income: | All Income Brackets |
| Education: | All Education Brackets |

From a Geographic Perspective: Country Has Been Selected: United States All Voting Parameter Variables Have Been Selected From the completed report stage 232, the researcher now has four options:

1. Clear All 234: This will reset the form and allow the researcher to select parameter variables again at the new PSR 212.

2. Run Report 236: This will allow the researcher to perform the research functions detailed on the Parameter Selection Report without saving the report to the List Profile and move the client to the your results page 246.

3. List Profiles 238: This will return the researcher to creating/selecting a profile 208 where the researcher must decide once again if they would like to research again a song researched previously, or "Create New Profile."

4. Update Profile 240: This will save the profile of this research query 242 to the List Profile as used in the profile selection 208. Saving the research Profile will enable the researcher to access the profile for this song upon a subsequent visit without completing the Parameter Selection Report again. Upon a subsequent visit, the researcher can modify the search/query parameters of the stored Parameter Selection Report. Use of a stored profile is discussed in greater detail in selecting a song from profiles 224, discussed below. With the researcher selecting update profiles 240, the researcher will receive an Update Confirmation 242. From Update Confirmation 242, the researcher moves to selection 244.

At 244, the researcher has the option to:

1. Return to the completed Parameter Selection Report 225 where they move to make changes 227 and decide if they would like to make changes to the PSR. If deciding to make changes, they proceed from make changes 227 to select reporting period 220. If they elect to proceed via review previous PSR 225 and subsequently decide that changes are not necessary, they may proceed to make changes 227 and then completed PSR 232 where they have the option to select from the four choices again: Clear All 234, Run Report 236, List Profiles 238 and Update Profile 240.

2. Proceed to Run Report 236 that meets the parameters set forth in the completed PSR 232. In any event, no matter how the client arrives at run report, the client moves on to the Your Results page results 246.

Your Results page 246 is received by researchers proceeding via run report 236. The "Your Results" pages 246 summarize the information that meets the demographic, geographic and voting parameters selected by the researcher on the completed Parameter Selection Report 232.

The aggregate information retrieved from the Information database that matches the query parameters selected in the completed PSR 232 can be evaluated 248 by the researcher using the "Your Results" pages 246.

In the evaluation 248, the client has the opportunity to evaluate the "raw" data provided in the "Your Results" pages 246 more specifically by fully employing the Information Database Processor of the invention. The Information Database Processor of the invention has the ability to refine and further evaluate the data already received and/or manipulate the query parameters to extract more precise information once a "Your Results" page has been reviewed.

After the evaluation 248, the client must decide if further evaluation of information is necessary. This takes place at further evaluations 250.

1. No further evaluation is necessary. From further evaluations 250 the researcher selects no and moves to the "List Profiles" 260 and back to create/select 208 where the researcher has the opportunity to (a) select to research another song from the songs stored in the "List Profile" 224 or (b) select to "Create New Profile" 212;

2. If Yes, further evaluation is necessary, there are two options available as the client proceeds to 252: A. Yes, further evaluation of the information provided in the existing report is necessary and move to select the additional evaluation parameters 252; or B. Yes, further evaluation of the information is necessary however, the client needs to modify 262 the query parameters to fine-tune the query is necessary. Each of these options will now be discussed briefly.

A. If further evaluation of the information provided in the existing report is necessary, the client has three methods to evaluate the existing data. First, the client can evaluate each unique voter and their voting history 254 while also evaluating their demographic profile. The Unique Voters and Voting History provides a researcher with a tool to evaluate each voter individually, from a demographic and geographic perspective, and will also permit a researcher to It measure the frequency and number of surveys completed by specific respondents. The Unique Voters and Voting History page is a summary, from a demographic, geographic and voting perspective, of each voter;

For example from the top of the "Your Results" page 246 the following information may be provided: "There are 78 unique individuals who have rated your song choice and who fall within the geographic and demographic parameters you selected." The 78 is "hyperlinked" and if a client acts upon this link, the invention will dynamically create a Voting History & Summary for each Unique Individual that participated in the survey.

For each respondent, the following information is provided:

1. Gender of the respondent;
2. Age bracket of the respondent;
3. Income bracket of the respondent;
4. Education level achieved by the respondent;
5. Radio Station listened to most frequently by the respondent;
6. Zip Code and State of the respondent.

All were provided when the respondent registered in FIG. 1, 102-108. Summarized below the demographic of each respondent, The Voting History & Summary Report also provides the date or dates each respondent completed and submitted a survey, and for each date or dates, the respondent's responses to each of the questions required, Familiarity, Passion and Burn, and the respondent's responses to the optional questions on the Ratings Page (152, 162, 174, 183, 196, all from FIG. 1.), if any. Upon completion of this evaluation, the researcher can return to the "Your Results" page 246 by clicking on the Back button of their browser.

The second option for a researcher wishing to evaluate more fully information from the existing Your Results pages is the Evaluation of Demographics of Specific Levels Within Variables 256. The Evaluation of Demographics of Specific Levels Within Variables 256 provides for the further evaluation of Category Variables. The "Category Variables" are:

1. Familiarity
2. Passion
3. Burn
4. Do You Own CD/Cassette?
5. Would You Like To Hear This Song On Your Station?
6. Where Did You First Hear This Song?
7. Comments Recall from FIG. 1, The Category Variables of 1. Familiarity
2. Passion
3. Burn are required of respondents completing a Ratings Page, FIG. 1, 152, 162, 174, 183, 196.

The Song Information Database processor provides for researchers to evaluate the demographics of the respondents for each "Category Variable" and the "Category Variable Levels." The Song Information Database processor also provides for further evaluation of the data generated.

For example, from the "Your Results" page, for the "Category Variable" Familiarity:

FAMILIARITY (Total Votes=487)

Total Yes: 468 Total No: 19

96.10% of those rating this song express some degree of familiarity.

Average Familiarity factor among those expressing a Yes: 9.40

| Vote | Count | PCT. |
|---|---|---|
| 1 | 28 | 5.98% |
| 2. | 3 | 0.64% |
| 3. | 0 | 0.00% |
| 4. | 0 | 0.00% |
| 5. | 0 | 0.00% |
| 6. | 0 | 0.00% |
| 7. | 0 | 0.00% |
| 8. | 0 | 0.00% |
| 9. | 4 | 0.85% |
| 10. | 433 | 92.52% |

Clicking on the Total Yes: 468 under Familiarity will result in a Familiarity Yes Demographic Breakdown Profile for each demographic category of the individuals that indicated any level of Familiarity on the Ratings Page. For example:

Total Yes: 468 Sex Breakdown

| Gender | Count | PCT |
|---|---|---|
| Male | 98 | 20.94% |
| Female | 370 | 79.06% |

Total Yes: 468 Age Breakdown

| Age | Count | PCT |
| --- | --- | --- |
| Under 18 | 82 | 17.52% |
| 18-24 | 18 | 3.85% |
| 25-34 | 177 | 37.82% |
| 35-44 | 122 | 26.07% |
| 45-54 | 56 | 11.97% |
| 55-64 | 6 | 1.28% |
| 65 & Over | 7 | 1.50% |

Total Yes: 468 Income Breakdown

| Income Level | Count | PCT | |
| --- | --- | --- | --- |
| Less Than 16K | 69 | 14.74% | |
| 16-24,999K | 62 | 13.25% | |
| 25-29,999K | 74 | 15.81% | |
| 30-39,999K | the Top Recurrent Chart page 136 | | 29.06% |
| 40-49,999K | 99 | 21.15% | |
| 50-59,999K | 12 | 2.56% | |
| 60-69,999K | 2 | 0.43% | |
| 70-79,999K | 14 | 2.99% | |
| 80,000 & Over | 0 | 0% | |

Total Yes: 468 Education Breakdown

| Education Level | Count | PCT |
| --- | --- | --- |
| Grades 1-12 | 261 | 55.77% |
| Some College | 72 | 15.38% |
| Technical Degree | 86 | 18.38% |
| Bachelor's Degree | 49 | 10.47% |
| Master's | 0 | 0.00% |
| Professional | 0 | 0.00% |
| Doctorate | 0 | 0.00% |

Recall from the Ratings Page (FIG. 1, 152, 162, 174, 183, 196) that a respondent indicating yes to Familiarity and Passion are asked to indicate the "level" of Familiarity and Passion on a scale of 1-10. 1-10 represents the Category Variable Level (CVL).

The database processor of the invention provides for researchers to evaluate a specific Category Variable Level. To evaluate a specific Category Variable Level, the researcher would click on a numerical entry provided within the Category Variable summary on the Your Results pages.

For example, within the Familiarity Category Variable from above, clicking on:

| Vote | Count |
| --- | --- |
| 1. | 28 | would provide the demographic profile (Age, Gender, Income and Education) of the 28 respondents who completed the survey with a "Yes" I am familiar and then selected Familiarity Variable level of "1".

Similar Category Variable Demographic Profiles are available for any underlined Category Variable entry on the "Your Results" page. Recall from the Ratings Page (FIG. 1, 152, 162, 174, 183, 196) with respect to the Category Variables of Familiarity and Passion, respondents, if not Familiar with the song and/or do not like the song, will indicate a "reason" for a negative response—not being familiar and not liking a song, respectively. The Your Results Pages provide a summary of this information as well. This summary is under the headings of "No Familiarity Breakdown" and "No Passion Breakdown." The database processor provides researchers with the ability to evaluate demographics of the "Count" for each "No" reason.

For example, from the previous exhibit:

FAMILIARITY (Total Votes=487)

Total Yes: 468 Total No: 19

No Familiarity Breakdown

| Reason | Count | PCT |
| --- | --- | --- |
| New Artist | 0% | 0% |
| New Single | 0 | 0% |
| Not On Radio | 2 | 10.53% |
| Not Seen Music Video | 13 | 68.42 |
| Rarely Listen to Radio | 0 | 0% |
| Other | 4 | 21.05% |

Clicking on the Total No: 19 would provide a similar exhibit shown above for Familiarity Yes.

Clicking on the Not Seen Music Video 13 68.42% would provide the demographic profile (Age, Gender, Income and Education) of the 13 respondents who completed the survey with a "No, I am not familiar" and then selected No Familiarity Category Variable reason of Not Seen Music Video.

Recall from the Ratings Page (FIG. 1, 152, 162, 174, 183, 196) with respect to the Category Variable "Burn," respondents, if indicating a Yes to Burn, where Burn is the Category Variable, must also indicate a level 1-10, where the 1-10 is the Category Variable Level.

Burn (Total Votes=487)

Total Yes: 58 Total No: 429

11.91% of those rating this song expressed burn. Average Burn Factor Among Those Expressing Burn: 9.84

| Vote | Count | PCT |
| --- | --- | --- |
| 1. | 1 | 1.72% |
| 2. | 0 | 0% |
| 3. | 0 | 0% |
| 4. | 0 | 0% |
| 5. | 0 | 0% |
| 6. | 0 | 0% |
| 7. | 0 | 0% |
| 8. | 0 | 0% |
| 9. | 0 | 0% |
| 10. | 57 | 98.28% |

Yes Burn Breakdown

| Reason | Count | PCT |
| --- | --- | --- |
| On Radio Too Much | 2 | 3.45% |
| Tired of Artist | 11 | 18.97% |

-continued

| Reason | Count | PCT |
|---|---|---|
| Never Liked | 24 | 41.38% |
| Too Old | 2 | 2% |
| Indistinct Sound | 1 | 1.72% |
| Other | 18 | 31.03% |

Clicking on any of the underlined Category Variable or Category Variable Levels would provide the demographic profile (Age, Gender, Income and Education) summary described above.

Similar demographic profiles are available for the Category Variable Levels for the non-required Category Variables of:

1. Do You Own CD/Cassette?
2. Where Did You First Hear This Song?

The Correlate Ownership Status With Familiarity, Passion and Burn 257 provides the researcher with the new and unique ability to evaluate how the Category Variables of Familiarity, Passion and Burn are affected or influenced by those that "Own CD" or those that "Don't Own CD." In evaluating Familiarity, Passion or Burn, researchers can now extract and evaluate only those that "Own CD" or conversely, evaluate Familiarity, Passion or Burn as they relate to individuals that "Don't Own CD." Researchers can now identify differences in the key variables through a better understanding of the ownership status of the respondents.

The next possible evaluation a researcher could employ from an existing report is the "Daily Voting Graph" 258 which provides the researcher with a bar graph reflecting completed surveys for each day within the Reporting Period. From this, a researcher can identify "key" dates during the life of the record.

A researcher reaching further evaluations 252 also has the choice, Yes, further evaluation of the information is necessary, however, modification of the query parameters to fine tune the query is necessary. This researcher proceeds back to parameters 262 which will return the researcher to the previously completed Parameter Selection Report 225. At this stage, the researcher proceeds to make changes 227 and decides what changes to the Parameter Selection Report are in order. This option for further review is provided so that researchers can modify the PSR for the extraction of a more precise data, for example, the elimination or addition of different query variables. From make changes 227, the researcher proceeds to select reporting period 220, where the researcher has the option to modify the Reporting Period. The researcher would proceed then to select demos 226 where the demographics are selected, then to select geographic 228, where one geographic parameter is selected. After select geographic 228, the researcher moves to select voting parameters 230, where the researcher indicates what voting parameters are to be evaluated. The researcher now has a newly created Parameter Selection Report 232 and can once again query the Information Database.

The second option for a researcher upon accessing create/select profiles 208 is to Select From Current Profiles 224. The Current Profile/List Profile 208 serves as a library of Parameter Selection Reports for songs that have been researched previously and have been saved by the client. The terms "Current Profile" and "List Profile" both refer to 208. The "List Profile" summarizes the demographic and geographic parameters selected by the researcher when the song was previously researched. This summary of information corresponds with the variables found on a blank Parameter Selection Report 212 or completed report 232. Assuming the researcher has completed a Parameter Selection Report previously, the Current Profiles 208 summarizes the following information:

1. Song—lists the title of the song;

2. Artist—lists the artist

3. Label—lists the record label

4. "S"—Sex—summarizes the Gender parameter(s) selected by the researcher when the report was activated previously;

5. "A"—Age—summarizes the Age parameter selected by the researcher when the report was activated previously;

6. "I"—Income—summarizes the Income parameter(s) selected by the researcher when the report was activated previously;

7. "E"—Education—summarizes the Education parameter(s) selected by the researcher when the report was activated previously.

8. "G"—Geographic—summarizes the Geographic parameter selected by the researcher when the report was activated previously;

9. "F"—Familiarity—summarizes the Familiarity parameter(s) selected by the researcher when the report was activated previously;

10. "P"—Passion—summarizes the Passion parameter(s) selected by the researcher when the report was activated previously;

11. "B"—Burn—summarizes the Burn parameters selected by the researcher when the report was activated previously;

12. "R"—Requests—summarizes the Request parameter selected by the researcher when the report was activated previously;

13. "O"—Own CD—summarizes the Own CD parameters selected by the researcher when the report was activated previously;

14. "D"—CD Purchase—summarizes the Where Did You Buy the CD parameters selected by the researcher when the report was activated previously;

15. "H"—Heard First—summarizes the Heard First parameter selected by the researcher when the report was activated previously;

16. "C"—Comments—summarizes the "Comments"

17. "Use"—the client wishing to run a report on a song researched previously selects "Use":

18. "Del"—the client wishing to delete a song from the Current Profiles list selects "Del".

In the event a client wishes to re-evaluate 224 a song that was previously researched, the client would click on the "Use" icon and would proceed then to review the previously completed Parameter Selection Report 225, making the decision to modify the PSR 227, leaving two options. The two options are:

1. No changes 232

2. Changes 220

If no changes then the client has a completed PSR 232 and moves to the four options:

1. Clear All 234: This will reset the form and allow the researcher to select parameter variables again at the new PSR 212.

2. Run Report 236: This will allow the researcher to perform the research functions detailed on the Parameter Selection Report without saving the report to the List Profile and move the client to the your results page 246.

3. List Profiles 238: This will return the researcher to creating/selecting a profile 208 where the researcher must decide once again if they would like to research again a song researched previously, or "Create New Profile."

4. Update Profile 240: This will save the profile of this research query 242 to the List Profile as used in the profile selection 208. Saving the research Profile will enable the researcher to access the profile for this song upon a subsequent visit without completing the Parameter Selection Report again. Upon a subsequent visit, the researcher can modify the search/query parameters of the stored Parameter Selection Report. Use of a stored profile is discussed in greater detail in selecting a song from profiles 224, discussed below. With the researcher selecting update profiles 240, the researcher will receive an Update Confirmation 242. From Update Confirmation 242, the researcher moves to selection 244.

At 244, the researcher has the option to:

1. Return to the completed Parameter Selection Report 225 where they move to make changes 227 and decide if they would like to make changes to the PSR. If deciding to make changes, they proceed from make changes 227 to select reporting period 220. If they elect to proceed via review previous PSR 225 and subsequently decide that changes are not necessary, they may proceed to make changes 227 and then completed PSR 232 where they have the option to select from the four choices again: Clear All 234, Run Report 236, List Profiles 238 and Update Profile 240.

2. Proceed to Run Report 236 that meets the parameters set forth in the completed PSR 232. In any event, no matter how the client arrives at run report, the client moves on to the Your Results page results 246. The Your Results Page 246 is outlined in the previous discussion.

If the client wishes to make changes, the client moves from make changes 227 to select reporting period 220. This process is also outlined in the previous discussion beginning with Select Reporting Period 220.

The entire process can now be repeated.

Chart History 206

The second option for a subscriber accessing the Backoffice Reporting Section of the invention is the review of Archived Charts 206. From Archived Charts 206, the client is provided with a menu of archived charts to select from 207, evaluate 209, and return to the chart selection for review 206.

Figure 3:
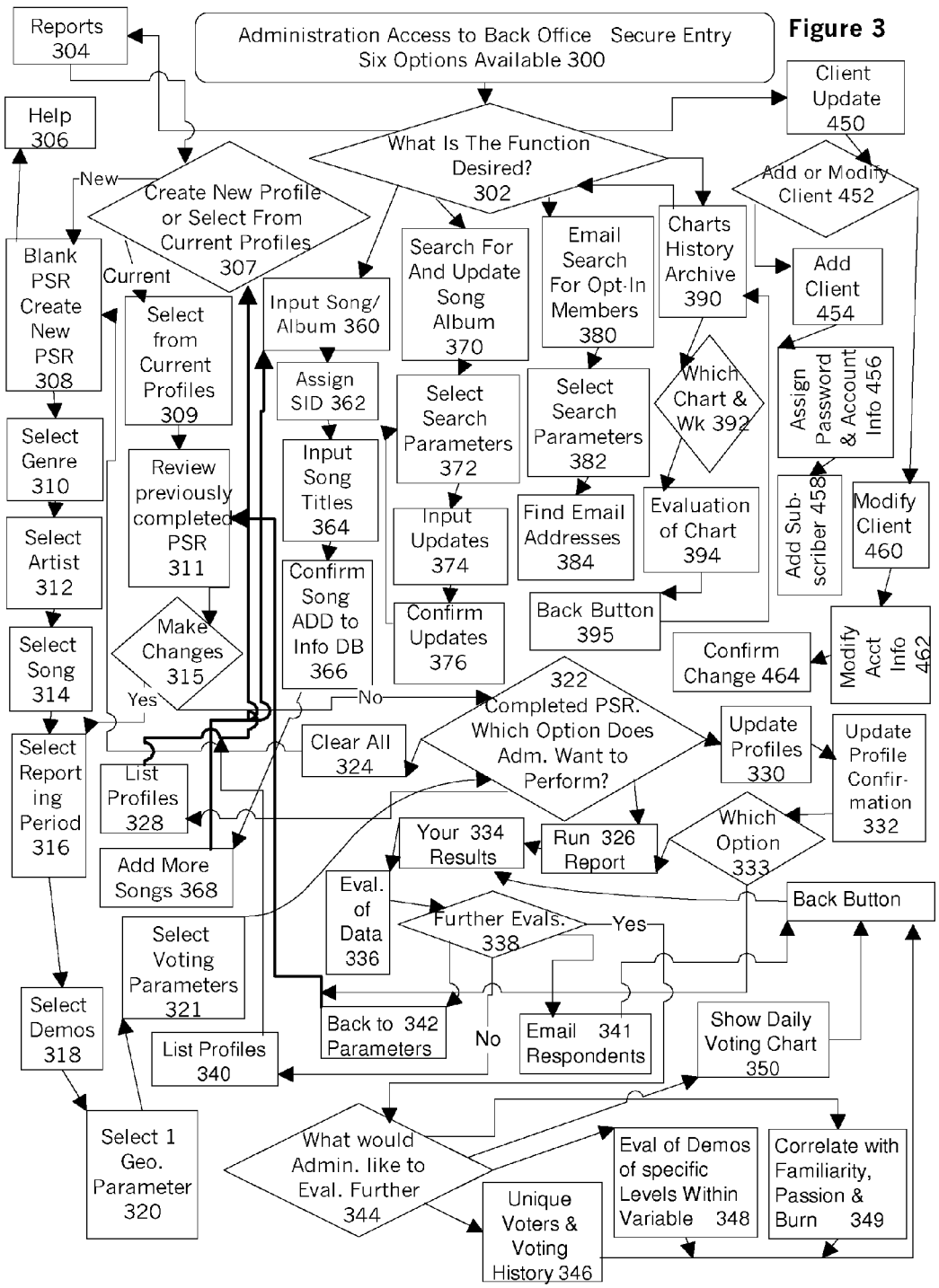
FIG. 3 is a flow chart diagram of the administrative interface representing the functions internal to the operation of the invention, including the input of song information, the update of song information, the email retrieval system, and the process for the addition or modification of access accounts for subscribing clients.

FIG. 3—Administrative/Operational Access to the Backoffice of the Invention

The Backoffice Reporting Section is accessed by administrative personnel and Clients using a secure entry 300. Passwords issued to Administrative personnel provide "Complete Access" to the database functions of the proprietary technology of the invention. Upon access, administrative personnel have six options to select from 302:

1. Reports 304
2. Input Song/Album Information Using NMS Coding and SID Numbering System 360
3. Search For and Update Song/Album Information Using NMS Coding and SID 370
4. Email Search for Opt-In Members 380
5. Charts History Archive 390
6. Add or Modify Subscribers 400

Each will be discussed individually.

1. Reports 304

When selecting 304 Reports, the client proceeds to creation/selection of profiles 307. Creation/selection of profiles 307 serves a dual purpose.

1. As an avenue to Create New Profile 308;
2. As a listing of songs researched previously where the client committed the song to the List Profiles 309.

Each will now be discussed in detail.

Blank PSR 308

Creating a New PSR—Completing The Parameter Selection Report

1. Select Genre 310
   a. Administrative personnel selects genre from the drop down box.

2. Select Artist 312
   a. Administrative personnel types the name of the artist in "Artist List" box.
   b. Administrative personnel "clicks" on "Artist List."
   C. Administrative personnel confirms name of artist by selecting the artist from the list of artists generated.

3. Select Song 314
   a. Administrative personnel types name of song or partial song title in the "Song List" box;
   b. Administrative personnel clicks on "Song List";
   c. Administrative personnel confirms song by selecting song from the list of songs generated.

4. Select Reporting Period 316
   a. Administrative personnel moves to the "Report Period" section and selects a "Report Period" beginning date;
   b. Administrative personnel selects a "Report Ending" date.

Administrative personnel can select:
   1. The most recent 183 day period, inclusive of the current date as the "Report Ending" date;
   2. Any consecutive dates within the 183 day period, inclusive of the current date as the "Report Ending" date;
   3. Any single day within the 183-day period, inclusive of the current date as the "Report Ending" date.

5. Select Demographic Parameters 318
   Queries may be made for a specific Gender, Age, Income and Education parameter, a combination of parameters within each parameter category, or the query may be made for all brackets within the parameter category.

6. Select One Geographic Parameter 320

Radio Station If selected, will provide only information submitted by individuals that (1) completed a survey for the song indicated in the Song List box and (2) individuals who indicated the station in the Radio Station List box as their station of choice when the individual registered. Personnel enters call letters, clicks on "Call List" and then confirms station from list generated. May select more than one station.

Zip Code If selected, will provide information (1) as submitted by individuals that indicated that Zip Code when the individual registered and;

(2) have voted for the song indicated in the Song List Box.

Must type at least the first number of the zip code for which they wish to query the database in the Zip Code box and then confirm the Zip Code from the list of Zip Codes generated.

May select more than one Zip Code from the list generated.

City: The major metropolitan areas of the United States have been defined as being comprised of zip codes surrounding the city. Similar to the Standard Metropolitan Statistical Areas (SMSA). Zip codes surrounding each city have been grouped and defined as that city.

If selected, will provide information as submitted by all individuals (1) whose Zip Codes fall within the Zip Codes that have been assigned to the City selected and (2) who have completed a survey for the song listed in the Song List box.

A single specific United States city may be selected, exclusive of other United States cities, or multiple United States cities may be selected, exclusive of other United States cities.

State: If selected, will provide research information as submitted by (1) individuals that live in the state selected and (2) have completed a survey for the song listed in the Song List box.

A single state may be selected, exclusive of all other states of the United States.

Region: If selected, will provide research information as submitted by (1) individuals that reside in that region of the United States and (2) have completed a survey for the song listed in the Song List box. Regions are the generally accepted regions used by labels in radio promotion.

Country: If selected, will provide research information as submitted by (1) individuals that reside in the Country selected and (2) have completed a song survey for the song listed in the Song List box. There are over 240 Countries available for selection by a subscribing client.

Universe: If selected, will provide research information as submitted by every Registered Member that has completed a song survey for the song listed in the Song List box, regardless of geographic location of the respondent.

7. Voting Parameters 321

The system defaults to selecting "Yes" for each of the Category Variables and Category Variable Levels described in FIG. 1. Administrative personnel may "de-select" any of these variables for which they may not be interested in evaluating. A description of the Category Variables and Category Variable Levels from a research perspective follows:

1. Familiarity:

Selection of a Yes will provide the total number of Yes responses. Selection of a Yes will also result in providing a breakdown, by each CVL, (the degrees of Familiarity 1-10), the number of submissions each degree received (1-10 as appears on the Ratings Page), as submitted by visitors that meet the demographic and geographic parameters selected by the client.

Selection of a No will provide the total number of No responses. Selection of a No will also result in providing a numerical breakdown for each possible reason for a No response (the CVL) as submitted by visitors that match the demographic and geographic parameters selected by the client. No does not mean that the client does not want to query the database for Familiarity.

2. Passion:

Selection of a Yes will provide the total number of Yes responses. Selection of a Yes will also result in providing a breakdown, by each CVL (the degrees of Passion 1-10), the number of submissions each degree of Passion received (1-10 as appears on the Ratings Page), as submitted by visitors that meet the demographic and geographic parameters selected by the client.

Selection of a No will provide the total number of No responses, but will also provide a breakdown for each possible No response (the CVL) as submitted by visitors that meet the demographic and geographic parameters selected by the client. No does not mean that the client does not want to query the database for Passion.

3. Burn:

Selection of a Yes will provide the total number of Yes responses. Selection of a Yes will also provide a breakdown, by each CVL (the degrees of Burn 1-10), the number of submissions for each degree of Burn received (1-10 as appears on the Ratings Page), as submitted by visitors that meet the demographic and geographic parameters selected by the client. In addition, selection of a "Yes-I am tired of a song," requires a reason why. This is the second CVL for the Burn question. There is also a breakdown, by each reason, indicating the number of individuals selecting each possible response for being tired.

Selection of a No will provide the total number of individuals that meet the demographic and geographic parameters selected, that submitted a "No"—I Am Not Tired of This Song-to this question. No does not mean that the client does not want to query the database for Burn.

4. Would You Like To Hear This Song On Your Station:

Selection of a Yes will provide the total number of people that meet the demographic and geographic parameters selected, who have checked Yes to this question.

Selection of a No will provide the total number of people that meet the demographic and geographic parameters selected, who have checked No to this question. A No on the Ratings Page is the equivalent of saying I don't want to request this song.

On the Parameter Selection Report, a "No" does not mean that the client does not want to query the database for Total requests for this song.

5. Own CD results:

Selection of a Yes:

The Yes will provide the total number of people that meet the demographic and geographic parameters selected, who have indicated that they own the CD.

A second query available with the Yes selection is whether or not the client would like to evaluate where, at what retailer, those purchases were made. Selection of "Purchased Where" provides a listing of the retailers, with the number of times that retailer was selected, as submitted by people that meet the demographic and geographic parameters selected. This is the CVL for a "Yes" response to Own CD.

Selection of a No:

The "No" provides the total number of people who have indicated that they do not own the CD, that meet the demographic and geographic parameters selected.

A second query available with the No selection is whether or not the client would like to evaluate why the CD hasn't been purchased. Selection of "Why Not" provides a listing of the reasons the CD has not been purchased by those that meet the demographic and geographic parameters selected. This is the CVL for a "No" response to Own CD.

6. Heard First:

A selection of Yes will provide the client with a total for each of the possible Heard First selections on the Ratings Page, as submitted by individuals that meet the demographic and geographic parameters selected. A selection of No is an indication that the client is not interested in receiving this information.

7. Read Comments:

A Selection of Yes will provide in individual paragraphs all of the comments as submitted by people that meet the demographic and geographic parameters selected. A selection of No is an indication that the client is not interested in receiving this information.

Completed Parameter Selection Report 322

As an example, the Parameter Selection Report has been completed as follows and the Information Database will be queried accordingly, if the client elects to run the report:

The database has been queried as follows:

| Genre: | Country |
| --- | --- |
| Artist: | Michael Peterson |
| Song: | Sure Feels Real Good |
| Report Period: | Sep. 1, 1999 through Sep. 30, 1999 |
| Gender: | Both Male and Female |
| Age: | All Age Brackets |
| Income: | All Income Brackets |
| Education: | All Education Brackets |

From a Geographic Perspective: Country Has Been Selected: United States All Research Variables Have Been Selected From the completed PSR 322, the researcher now has four options:

1. Clear All 324: This will reset the form and allow the researcher to select parameter variables again in a blank PSR 308;

2. Run Report 326: This will allow the researcher to perform the research functions and obtain results 334 detailed on the Parameter Selection Report without saving the report to the List Profile.

3. List Profiles 328: This will list songs that have been researched previously along with the research variables used when the song was added to the List Profiles and allow selection 307.

4. Update Profile 330: This will save the profile of this research query to the List Profile for selection 307. Saving the research Profile will enable the researcher to access the profile for this song upon a subsequent visit without completing the Parameter Selection Report again. Upon a subsequent visit, the researcher can modify the search/query parameters of the stored Parameter Selection Report. Use of a stored profile is discussed in greater detail in 309. With the researcher selecting updating profile 330, which confirms the update 332, and then allows selection of options 333. At selection of options 333, the researcher has the option to:

1. Return to the previously completed Parameter Selection Report 311, and then proceed to 315 to Make Changes or, if no changes are necessary, proceed to the completed PSR 322; or 2. Proceed to run report 326 that meets the parameters set forth in the completed PSR 322.

Your Results page 334 is received by researchers proceeding via run report 326. "Your Results" pages 334 summarize the information that meets the demographic, geographic and voting parameters selected by the researcher on the completed Parameter Selection Report 322.

The aggregate information retrieved from the Information database that matches the query parameters selected in the completed PSR 322 can be evaluated 336 by the researcher using the "Your Results" pages 334.

The client has the opportunity to evaluate 336 the "raw" data provided via the "Your Results" pages 334 more specifically by fully employing the Information Database Processor of the invention. The Information Database Processor has the ability to refine and further evaluate the data already received and/or manipulate the query parameters to extract more precise information once a "Your Results" page has been reviewed.

After the initial evaluation 336, the operator must decide if further evaluation of information is necessary. This takes place at further evaluation page 338. There is a fourth option available to the operator, unrelated to further evaluation of the present data. The fourth option available to Administrative personnel is "Email Respondents" 341.

First, let's evaluate the three options available related to further evaluation 338:

1. No further evaluation is necessary go to list profiles 340;

2. Yes, further evaluation of the information provided in the existing report is necessary 344; or 3. Yes, further evaluation of the information is necessary; however, modification of the query parameters to fine-tune the query is necessary 342.

Each of these options will now be discussed briefly.

1. If no further evaluation is necessary, the researcher selects list profiles 340 and returns to the create/select profiles 307 where the researcher has the opportunity to (a) select 309 to research another song from the songs stored in the "List Profile" or (b) select to "Create New Profile" 308.

2. If further evaluation of the information provided in the existing report is necessary, the client has three methods to evaluate the existing data. First, the client can evaluate each unique voter and their voting history 346 while also evaluating their demographic profile. The Unique Voters and Voting History 346 provides a researcher with a tool to evaluate each voter individually, from a demographic and geographic perspective, and will also permit a researcher to measure the frequency and number of surveys completed by specific respondents. The Unique Voters and Voting History page is a summary, from a demographic, geographic and voting perspective, of each voter.

For example from the top of the "Your Results" page 334 the following information may be presented: "There are 78 unique individuals who have rated your song choice and who fall within the geographic and demographic parameters you selected." Clicking on the 78 will result in a Voting History & Summary for each of the Unique Individuals. The following information is provided:

1. Gender of the respondent;
2. Age bracket of the respondent;
3. Income bracket of the respondent;
4. Education level achieved by the respondent;
5. Radio Station listened to most frequently;
6. Zip Code and State.

All were provided when the respondent registered in FIG. 1, 102-108. Summarized below the demographic of each respondent, The Voting History & Summary Report continues to provide the date or dates each respondent completed and submitted a survey, and for each date or dates, the respondent's responses to each of the questions required, Familiarity, Passion and Burn, and the respondent's responses to the optional questions, if any, on the Ratings Page (152, 162, 174, 183, 196, all from FIG. 1.) Upon completion of this evaluation, the researcher can return to the "Your Results" 334 page by clicking on the Back button of their browser.

Second, the evaluation of demographics of specific levels in the variables 348 provides for the further evaluation of Category Variables. The "Category Variables" are:

1. Familiarity
2. Passion
3. Burn

The Category Variables are required of respondents completing a Ratings Page, FIG. 1, 152, 162, 174, 183, 196.

The Song Information database processor of the invention provides for researchers to evaluate the demographics of the respondents for each "Category Variable" and the "Category Variable Levels."

For example, from the "Your Results" page 334, for the "Category Variable"

Familiarity:

FAMILIARITY (Total Votes=487)

Total Yes: 468 Total No: 19

96.10% of those rating this song express some degree of familiarity. Average Familiarity factor among those expressing a Yes: 9.40

| Vote | Count | PCT. |
|---|---|---|
| 1 | 28 | 5.98% |
| 2. | 3 | 0.64% |
| 3. | 0 | 0.00% |
| 4. | 0 | 0.00% |
| 5. | 0 | 0.00% |
| 6. | 0 | 0.00% |
| 7. | 0 | 0.00% |
| 8. | 0 | 0.00% |
| 9. | 4 | 0.85% |
| 10. | 433 | 92.52% |

Clicking on the Total Yes: 468 under Familiarity will result in a Familiarity Yes Demographic Breakdown Profile of the individuals that indicated any level of Familiarity on the Ratings Page. For example:

Total Yes: 468 Sex Breakdown

| Gender | Count | PCT |
|---|---|---|
| Male | 98 | 20.94% |
| Female | 370 | 79.06% |

Total Yes: 468 Age Breakdown

| Age | Count | PCT |
|---|---|---|
| Under 18 | 82 | 17.52% |
| 18-24 | 18 | 3.85% |
| 25-34 | 177 | 37.82% |
| 35-44 | 122 | 26.07% |
| 45-54 | 56 | 11.97% |
| 55-64 | 6 | 1.28% |
| 65 & Over | 7 | 1.50% |

Total Yes: 468 Income Breakdown

| Income Level | Count | PCT |
|---|---|---|
| Less Than 16K | 69 | 14.74% |
| 16-24,999K | 62 | 13.25% |
| 25-29,999K | 74 | 15.81% |
| 30-39,999K | the Top Recurrent Chart page 136 | 29.06% |
| 40-49,999K | 99 | 21.15% |
| 50-59,999K | 12 | 2.56% |
| 60-69,999K | 2 | 0.43% |
| 70-79,999K | 14 | 2.99% |
| 80,000 & Over | 0 | 0% |

Total Yes: 468 Education Breakdown

| Education Level | Count | PCT |
|---|---|---|
| Grades 1-12 | 261 | 55.77% |
| Some College | 72 | 15.38% |
| Technical Degree | 86 | 18.38% |
| Bachelor's Degree | 49 | 10.47% |
| Master's | 0 | 0.00% |
| Professional | 0 | 0.00% |
| Doctorate | 0 | 0.00% |

Recall from the Ratings Page (FIG. 1, 152, 162, 174, 183, 196) that a respondent indicating yes to Familiarity and Passion are asked to indicate the "level" of Familiarity and Passion on a scale of 1-10. This is the Category Variable Level (CVL).

The database processor of the invention provides for researchers to evaluate a specific Category Variable Level. The Your Results page summarizes for each Category Variable, the number of responses each Category Variable Level received. To evaluate a specific Category Variable Level, the researcher would click on a numerical entry provided within the Category Variable summary on the Your Results pages.

For example, within the Familiarity Category Variable, clicking on:

| Vote | Count |
|---|---|
| 1. | 28 | where 1 represents a Familiarity Level of 1 and 28 represents the number of respondents indicating a Familiarity Level of 1, would provide the demographic profile (Age, Gender, Income and Education) of the respondents who completed the survey with a "Yes" I am familiar and then selected Familiarity Variable level of "1".

Similar Category Variable Demographic Profiles are available for any underlined Category Variable entry on the "Your Results" page.

Recall from the Ratings Page (FIG. 1, 152, 162, 174, 183, 196) with respect to the Category Variables of Familiarity and Passion, respondents, if not Familiar with the song and/or do not like the song, will indicate a "reason" for a negative response—not being familiar and not liking a song, respectively. The Your Results Pages 334 provide a summary of this information as well. This summary is under the headings of "No Familiarity Breakdown" and "No Passion Breakdown." The database processor provides researchers with the ability to evaluate demographics of the "Count" for each "No" reason.

For example, from the previous exhibit:

FAMILIARITY (Total Votes=487)

Total Yes: 468 Total No: 19

No Familiarity Breakdown

| Reason | Count | PCT |
|---|---|---|
| New Artist | 0% | 0% |
| New Single | 0 | 0% |
| Not On Radio | 2 | 10.53% |
| Not Seen Music Video | 13 | 68.42 |
| Rarely Listen to Radio | 0 | 0% |
| Other | 4 | 21.05% |

Clicking on the Total No: 19 would provide a similar exhibit shown above for Familiarity Yes.

Clicking on the Not Seen Music Video 13—b 68.42% would provide the demographic profile (Age, Gender, Income and Education) of the 13 respondents who completed the survey with a "No, I am not familiar" and then selected No Familiarity Category Variable reason of Not Seen Music Video.

Recall from the Ratings Page (FIG. 1, 152, 162, 174, 183, 196) with respect to the Category Variable "Burn," respondents, if indicating a Yes to Burn, where Burn is the Category Variable, must also indicate a level 1-10, where the 1-10 is the Category Variable Level.

Burn (Total Votes=487)

Total Yes: 58 Total No: 429

11.91% of those rating this song expressed burn.

Average Burn Factor Among Those Expressing Burn: 9.84

| Vote | Count | PCT |
|---|---|---|
| 1. | 1 | 1.72% |
| 2. | 0 | 0% |
| 3. | 0 | 0% |
| 4. | 0 | 0% |
| 5. | 0 | 0% |
| 6. | 0 | 0% |
| 7. | 0 | 0% |
| 8. | 0 | 0% |
| 9. | 0 | 0% |
| 10. | 57 | 98.28% |

Yes Burn Breakdown

| Reason | Count | PCT |
|---|---|---|
| On Radio Too Much | 2 | 3.45% |
| Tired of Artist | 11 | 18.97% |
| Never Liked | 24 | 41.38% |
| Too Old | 2 | 2% |
| Indistinct Sound | 1 | 1.72% |
| Other | 18 | 31.03% |

Clicking on any of the underlined Category Variable or Category Variable Levels would provide the demographic profile (Age, Gender, Income and Education) summary described above.

Similar demographic profiles are available for the non-required Category Variable Levels for:

1. Do You Own CD/Cassette?
2. Where Did You First Hear This Song?

Third, the Correlate Ownership Status With Familiarity, Passion and Burn 349 provides the researcher with the new and unique ability to evaluate how the Category Variables of Familiarity, Passion and Burn are affected or influenced by those that "Own CD" or those that "Don't Own CD." In evaluating Familiarity, Passion or Burn, researchers can now extract and evaluate only those that "Own CD" or conversely, evaluate Familiarity, Passion or Burn as they relate to individuals that "Don't Own CD." Researchers can now identify differences in the key variables through a better understanding of the ownership status of the respondents The "Daily Voting Graph" 350 provides the researcher with a bar graph reflecting completed surveys for each day within the Reporting Period. From this, a researcher can identify "key" dates during the life of the record.

The third option for a researcher who when reaching evaluation 336 and deciding that further evaluation is necessary 338 is to return to the previously completed Parameter Selection Report 311. At this stage, the researcher proceeds to make changes 315 and decides what changes to the Parameter Selection Report are in order. This option for further review is provided so that researchers can modify the PSR for the extraction of a more precise data, for example, for the elimination or addition of different query variables. From make changes 315, the researcher proceeds to select the reporting period 316, where the researcher has the option to modify the Reporting Period. The researcher would proceed then to demographic selection 318 where the demographics are selected, then to geographic parameters 320, where one geographic parameter is selected. After the geographic parameters 320, the researcher moves to selecting the voting parameters 321, where the researcher indicates what voting parameters are to be evaluated. The researcher now has a newly created Parameter Selection Report 322 and can once again query the Information Database.

Finally, in e-mail respondents 341, if the need should arise to make contact and communicate with each individual that participated in the foregoing study exists, the Administrative access personnel have the ability to select e-mail respondents 341, compose an email and send it to each of the respondents of the present survey. Note that this option is not available to clients. Should a client desire to communicate with a set of respondents, the client merely provides the query parameters, and the administrative personnel can run the corresponding report and then complete the email campaign on behalf of the client.

The second option for an Administrator upon accessing 307 is to Select From Current Profiles.

The Current Profile 307 serves as a library of Parameter Selection Reports for songs that have been researched previously and have been saved by the client. The terms "Current Profile" and "List Profile" both refer to 307. The "List Profile" summarizes the demographic and geographic parameters selected by the researcher when the song was previously researched. This summary of information corresponds with the variables found on a Parameter Selection Report as a blank PSR 308 or complete PSR 322. Assuming the researcher has completed a Parameter Selection Report previously, in columnar form, the Current Profiles 307 summarizes the following information using the headings:

1. Song—lists the title of the song;
2. Artist—lists the artist
3. Label—lists the record label The following are abbreviated with a legend appearing at the bottom of the page defining each abbreviation:

4. "S"—Sex—summarizes the Gender parameter(s) selected by the researcher when the report was activated previously;
5. "A"—Age—summarizes the Age parameter selected by the researcher when the report was activated previously;
6. "I"—Income—summarizes the Income parameter(s) selected by the researcher when the report was activated previously;
7. "E"—Education—summarizes the Education parameter(s) selected by the researcher when the report was activated previously.
8. "G"—Geographic—summarizes the Geographic parameter selected by the researcher when the report was activated previously;
9. "F"—Familiarity—summarizes the Familiarity parameter(s) selected by the researcher when the report was activated previously;
10. "P"—Passion—summarizes the Passion parameter(s) selected by the researcher when the report was activated previously;
11. "B"—Burn—summarizes the Burn parameters selected by the researcher when the report was activated previously;
12. "R"—Requests—summarizes the Request parameter selected by the researcher when the report was activated previously;
13. "O"—Own CD —summarizes the Own CD parameters selected by the researcher when the report was activated previously;
14. "D"—CD Purchase—summarizes the Where Did You Buy the CD parameters selected by the researcher when the report was activated previously;
15. "H"—Heard First—summarizes the Heard First parameter selected by the researcher when the report was activated previously;
16. "C"—Comments—summarizes the "Comments"
17. "Use"—the client wishing to run a report on a song researched previously selects "Use":
18. "Del"—the client wishing to delete a song from the Current Profiles list selects "Del".

In the event the Administrative personnel desires to re-evaluate 309 a song that was previously researched, the Administrator would select "Use" (#17) and would proceed then to review 311 where they would review the previously completed Parameter Selection Report, making the decision to modify the PSR in make changes 315, leaving two options. The two options are:

1. No Changes
2. Changes

If No Changes, the Administrator moves directly to 322 to the four options:

1. Clear All 324: This will reset the form and allow the researcher to select parameter variables again in a blank PSR 308;
2. Run Report 326: This will allow the researcher to perform the research functions and obtain results 334 detailed on the Parameter Selection Report without saving the report to the List Profile.

3. List Profiles 328: This will list songs that have been researched previously along with the research variables used when the song was added to the List Profiles and allow selection 307.

4. Update Profile 330: This will save the profile of this research query to the List Profile for selection 307. Saving the research Profile will enable the researcher to access the profile for this song upon a subsequent visit without completing the Parameter Selection Report again. Upon a subsequent visit, the researcher can modify the search/query parameters of the stored Parameter Selection Report. Use of a stored profile is discussed in greater detail in 309. With the researcher selecting updating profile 330, which confirms the update 332, and then allows selection of options 333. At selection of options 333, the researcher has the option to:

1. Return to the previously completed Parameter Selection Report 311, and then proceed to 315 to Make Changes or, if no changes are necessary, proceed to the completed PSR 322; or
2. Proceed to run report 326 that meets the parameters set forth in the completed PSR 322. The Your Results Pages 334 are outlined in the previous discussion.

The second choice for an Administrator accessing the database and selecting from the Current Profiles is to make changes to an existing song profile. In this event, the Administrator moves from selecting a profile 309 to review a previous PSR 311 to making changes 315 and then to selecting the reporting period 316. Beginning with the reporting period 316, this process is outlined in the previous discussion.

There is one difference between the report generated by Administrative personnel and reports generated by clients. Administrative personnel have the ability to "Email Respondents" 341 to a given survey through the "Email Respondents" push-button at the bottom of the "Your Results" page.
360 Input Song/Album Information Using NMS Coding and SID Numbering System Upon access to the Backoffice, administrative personnel have the option to select "Add Song" which results in a Song Input Worksheet. The operator then proceeds to assigning an SID 362, where they are provided with the initial input form, Stage 1. Here they will add the appropriate information to the worksheet, beginning with the:

1. Album Title

2. Album Release Date

3. Album Post Date

4. Artist

5. Genre/Format—selected from the drop down box provided and used in the proprietary SID Numbering system. The choices are:
A/C=A/C
AL=Alternative
CH=Christian
CL=Classic Rock
CO=Country
JA=Jazz
RO=Rock
UR=Urban 6. Label Name—full name of the recording label 7. Short Label Name the abbreviated label name used in the proprietary SID Numbering system 8. Album Catalog Number from the UPC 9. Number of Songs to Be Added Initially.

After completing the above information, the Administrator "clicks" on the Add Songs icon 364, the user will confirm 366 that the information provided thus far is correct and then commits to adding the song titles to the Song Input Worksheet, Step 2.

364—Input Song Titles

After "clicking" on "Add Songs" in 362, the operator will receive a Song Input Worksheet and will complete the Song Input Worksheet accordingly.

1. The Song ID#—is generated from the information provided on assign SID 362. The SID is comprised of the defined abbreviation for the genre, the defined abbreviation for the record label, five or more numbers from the UPC and the track number of the song. For example, CO-MCA-1the Album Chart page 1428-1, would represent an album entry from the Country genre, an album on MCA, a George Strait album and the first track on that album. This column is automatically generated for the number of songs indicated in assign SID 362, item 9.

2. The Post Date—is the date the system will recognize the song listing and place it on the site. An automatic process based on the date entered in the Album Post Date entry on assign SID 362, item 3, and the date of the computer system.

3. The Song Title—is the title of the song. Input by the operator.

4. The Song Status—defines the page on the site (FIG. 1) the song will appear. Input by the operator. Operator selects from:

(a) NRS which in conjunction with the Radio Add Date, will place the song on the New Release Singles Page FIG. 1, 134, when the Radio Add Date is reached. FIG. 1, the New Release Singles page 134. Songs with a NRS status are eligible to appear on the New Release Singles Chart Page FIG. 1, the New Release Singles Chart page 132, if enough points are accumulated. A song with a NRS status automatically converts to an ARC status as described in FIG. 1;

(b) ARC designates songs that appear on the Archive Page, FIG. 1, the Archive page 138. Songs with an ARC status are eligible to appear on the Top Recurrent Chart Page FIG. 1, the Top Recurrent Chart page 136, if enough points are accumulated. Songs with an ARC status automatically convert to SLI as described in FIG. 1;

(c) SLI designates songs that appear in the Singles Library, FIG. 1, the Singles Library page 140.

(d) NRA indicates that the individual song receives no preferential treatment with regard to an individual page listing, such as the New Release Singles Page, but will be listed on the Album Track Listing described beginning in FIG. 1, the New Release Albums page 144.

5. The Sound Clip Name—automatically assigned based on the information provided in 362. Assigned whether a sound clip is available or not.

6. SOK Box—With a check mark, identifies that a sound clip is available. Without a check mark, indicates that a sound clip is not available. System will "look" for the check mark to determine if a clip is available and will therefore be able to identify that a hyperlink to the clip should be activated.

7. Radio Add Date—identifies when the song, if it has a "song status" of NRS, will appear on the New Release Singles Page.

Search For and Update Song/Album Information 370 Using NMS Coding and SID Numbering System Upon access to the Backoffice, operational personnel have the option to select "Update Song" 370 which results in "Enter Song/Album Info to Update" form.

Operational personnel may search 372 in a broad or narrow scope. Personnel may search by:

1. Genre—will list all Albums by Genre. Search is performed using the Genre abbreviations assigned in assign SID 362 #5.

2. Label Short Name—will list all albums in the database that have the label short name as indicated in their SID.

3. Album Name—operator can search by Album Name. Will list all album name matches from which the Administrative personnel can select the one desired.

4. Artist Name—operator can search by Artist Name. Will list all artist name matches from which the Administrative personnel can select the one desired.

5. Album Catalog Number—operator can search by the catalog number assigned to the album in 362, item 8, if it is known.

In input updates 374, the search is successfully completed, the Administrative personnel receives the Song Input Worksheet described in 364 and the operator can input the updates to the album. Information is updated and the administrative personnel clicks on "Update" 376. The processing then returns to search parameters 372.

Email Search For Opt-In Members 380

From the "drop down menu" Administrative personnel select "Gather Email Addresses" and are then provided with an Email Search Request form 382. Upon completion of the request form 382, the Administrator is provided with the "E-Mail Search Results," 384 a listing of the email addresses that match the search criteria.

The Email Search can be limited or broad in focus. Administrative personnel can search by any one of the following or a combination of some or a combination of all:

1. Zip Code—can search in a broad nature by indicating only the first number of a zip code series (1 would provide a listing of all registrants whose zip code begins with a 1) or can narrow the search by indicating a five digit zip:

2. Region—predefined and selected from a drop down box;

3. Favorite Format—selected from a drop down box. Possible selections are:

5 A/C=A/C
AL=Alternative
CH=Christian
CL=Classic Rock
CO=Country
JA=Jazz
=Rock
UR=Urban;

4. Artist—by Artists name—will limit the results to individuals that have completed a survey for any song by this artist;

5. Album Title—will limit the results to individuals who have completed a survey for any song on this album;

6. Passion Level—typically used in conjunction with either the Artist or Album Title searches. Will result in providing a listing of all respondents who have expressed a positive degree of Passion for the Artist or Album named. This feature can also be limited to a specific degree of Passion. Can limit the results to only individuals that provided, for example, a Passion Category Variable Level of "7 and Greater" for the Artist or Album named.

The search can be further extended to include specific Gender, Age, Income or Education brackets. These can be a specific bracket or a combination of brackets.

Chart History 390

The fifth option for a subscriber accessing the Backoffice Reporting Section of the invention is the review of Archived Charts 390. From archived charts 390 the client selects the week and chart 392. From the selection 392, the client is provided with a menu of archived charts to select from to evaluate 394 and go back 395.

Client Update 450—Add or Modify Subscribers

Client update 450 provides Administrative personnel with the choice 452 to:

1. Add New "Clients" or Subscribers 454;
2. Modify the accounts of existing subscribers 460.

Upon selecting client update 450, the operator receives the interface choice selection 452 at which point they decide if they want to "Add" a client 454 or "Modify" 460 an existing client (subscriber).

Each will now be discussed.

1. Add New Client or Subscriber 452

In the user interface the operator selects "Add Subscriber" 454 and is then provided with the password and account input interface 456. In the account interface 456, the operator issues:

1. Account Name
2. Account Password. If record label or radio station, the Account Password is preceded by the genre that pertains to that label or station. For example, if a Country station or Country label, the password would be preceded by a CO. The Account Password limits the format access of the subscriber.
3. Completes the contact information for the subscriber.
4. Assigns an Account Type. Account Type can be Radio Station, Record Label, Music Retailer or Complete Access.
5. Inputs the Expiration Date.

The new Subscriber is now added. The new account may be modified in the future by accessing the selection 452, and then selecting Modify 460 when the interface is viewed.

In the selection 452, when modifying 460 an existing account, the operator can search for all accounts but also has the opportunity to limit the search for the account and may do so by selecting a Genre or Account Type.

The Genre selections are:

1. A/C—A/C
2. AL—Alternative
3. CH—Christian
4. CO—Country
5. CR—Classic Rock
6. JA—Jazz
7. RO—Rock
8. UR—Urban The possible Account Type selections are:

1. Radio
2. Record Label
3. Retailer

If the search is limited, that is to say, the operator searches for a specific Genre or Account Type, a listing of all accounts within the Genre or Account Type will result. If the search is not limited, that is to say, the operator searches for All Accounts, a listing of all accounts will result.

Regardless of how the operator searches, a listing of account results, which provides a summary of each account, its password, the Account Type, and the expiration date.

The search is conducted in the selection 452 resulting in the listing of accounts, 460. To the right of the listing, the operator may select from Modify or Delete. Each of these selections will now be briefly discussed.

1. Modify will return the operator to the completed interface form 462, which is the same form that was completed when the account was first activated, 456. Administrative personnel selects Modify, makes any changes, confirms 464 and the account is now modified.

2. Should the Account no longer need to exist or has been canceled, the Administrative personnel selects Delete (not shown).

Referring now to FIG. 4, a flow chart diagram representing briefly the relationship and interaction between FIG. 1, FIG. 2 and FIG. 3.

Internal Operational Access 400 begins the whole process. Here, we find the Administrative personnel gaining access to the Backoffice section of the site, and creating the Song Database 402 by entering Song/Album information into the database which may be accessed 406. This information resides on the server, and is readily available to any consumer that visits the site described in FIG. 1 and makes a database page request.

In the user accesses the site 404, requests clearance for entry, clears the Secure Entry, then makes a database request 408 for a specific page, which is then dynamically created. The user can interact 406 with various pages, and can provide Preference information 410 which is then updated 412 in a Song Information Database 418, and then stored for access by clients.

The client makes communication 414 with the Reporting Database 418, requests clearance for entry, clears the Secure Entry and now has access 416 to the reporting features of the invention where they select the Query Parameters 420 and make the request upon the Reporting Database 418 which contains the preference information provided by Registered Members. The information the client requested is retrieved 422 and can be refined in 424 by re-selecting the Query Parameters 420.

CONCLUSION

Although use of the invention described herein relates specifically to the music industry and the research methods employed by such, the invention has application to a wide range of fields where the preferences of consumers are important to the success of the product. Thus, although there have been described particular embodiments of the present invention of a new and useful Demographic Information Database Processor, it is not intended that such references be construed as limitations upon the scope of this invention except as set forth in the following claims.

What is claimed is:

1. A computer system for collecting consumer preference information relating to songs and albums from a plurality of registered users and for allowing a plurality of subscribing clients to access the collected consumer preference information, comprising:

a user database containing demographic profile information for a plurality of registered users, the demographic profile information for each registered user including information regarding each registered user's zip code, country, favorite radio format, favorite or most frequently listened to radio station, user name, user password, user email address, gender, age, income, and education bracket;

an opt-in database containing user email addresses for registered users who have chosen to receive emails containing music and entertainment information, the music and entertainment information including information regarding new releases and concert schedules;

a radio station database containing information regarding a plurality of radio stations, each radio station having an associated zip code and radio format, the radio station database including information regarding each radio station's associated zip code and radio format;

a song information database containing information identifying songs and albums, each song having an associated song status and song genre format, each album including an associated album status and album genre format, the song information database including information identifying the song status and song genre format for each song and the album status and album genre format for each album, the song information database including consumer preference information from registered users for the songs and albums included in the song information database; and a processor adapted to cause the computer system to allow a non-registered user to register as a registered user of the computer system, to allow registered users included in the user database to input consumer preference information regarding the songs and albums included in the song information database, to allow registered users included in the user database to recover lost user passwords from the computer system, to allow subscribing clients to search the consumer preference information stored in the song information database based on predetermined search parameters, and to allow subscribing clients to generate reports using the consumer preference information stored in the song information database based on predetermined reporting parameters.

2. The computer system of claim 1, wherein:
the processor is adapted to cause the computer system to allow a non-registered user to register as a registered user by entering demographic profile information regarding the non-registered user into the computer system; and
the processor is adapted to cause the computer system to store the demographic profile information entered by the non-registered user in the user database included in the computer system.

3. The computer system of claim 2, wherein the demographic profile information entered by the non-registered user includes information regarding the non-registered user's zip code, country, favorite radio format, favorite or most frequently listened to radio station, user name, user password, user email address, gender, age, income, and education bracket.

4. The computer system of claim 3, wherein, when the non-registered user enters the non-registered user's zip code and favorite radio format into the computer system, the processor is adapted to cause the computer system to automatically generate a listing of radio stations that the non-registered user could listen to based on the non-registered user's zip code and favorite radio format, to display the listing of radio stations to the non-registered user, to prompt the non-registered user to select a radio station from the listing of radio stations that is the non-registered user's favorite radio station or that is the radio station that the non-registered user listens to most frequently, and, when the non-registered user selects a radio station, to add the selected radio station to the demographic profile information associated with the non-registered user and stored in the user database.

5. The computer system of claim 4, wherein the processor only causes the computer system to automatically generate the listing of radio stations that the non-registered user could listen to when the non-registered user's country is the United States.

6. The computer system of claim 5, wherein, when the non-registered user's favorite or most frequently listened to radio station is not included in the listing of radio stations automatically generated by the computer system, the processor is adapted to cause the computer system to allow the non-registered user to enter information identifying the non-registered user's favorite or most frequently listened to radio station, to add the information identifying the non-registered user's favorite or most frequently listened to radio station to the demographic profile information associated with the non-registered user and stored in the user database, and to add the information identifying the non-registered user's favorite or most frequently listened to radio station to the radio station database included in the computer system.

7. The computer system of claim 2, wherein, when the non-registered user has entered the demographic profile information associated with the non-registered user, the processor is adapted to cause the computer system to automatically generate a temporary password for the non-registered user and to automatically generate and send an email containing the user name entered by the non-registered user and the temporary password generated by the computer system to the non-registered user.

8. The computer system of claim 7, wherein:
the non-registered user must use the user name entered by the non-registered user and the temporary password generated by the computer system when initially accessing the computer system in order to become a registered user; and
the non-registered user must use the user name and user password entered by the non-registered user when subsequently accessing the computer system.

9. The computer system of claim 1, wherein:
the processor is adapted to cause the computer system to allow a registered user included in the user database to input consumer preference information regarding the songs and albums included in the song information database by entering the registered user's user name and user password into the computer system; and
when the registered user enters the registered user's user name and user password, the processor is adapted to cause the computer system to generate a listing of genre format categories associated with songs and albums stored in the song information database included in the computer system, to display the listing of genre format categories to the registered user, and to prompt the registered user to select a genre format category from the listing of genre format categories.

10. The computer system of claim 9, wherein the listing of genre format categories generated by the computer system includes A/C, Alternative, Christian, Classic Rock, Country, Jazz, Rock, and Urban genre format categories.

11. The computer system of claim 9, wherein, when the registered user selects a genre format category, the processor is adapted to cause the computer system to generate a listing of database pages associated with the selected genre format category, to display the listing of database pages to the registered user, and to prompt the registered user to select a database page from the listing of database pages.

12. The computer system of claim 11, wherein the listing of database pages associated with the selected genre format category includes:
   a new release singles chart page, a new release singles page, a top recurrent chart page, an archive page, a singles library page, an album chart page, a new release albums page, and an album library page; or
   a top recurrent chart page, an archive page, an album chart page, and an album library page.

13. The computer system of claim 12, wherein the new release singles chart page includes a numerical listing of songs having a song status of new release single based on votes received from registered users of the computer system.

14. The computer system of claim 12, wherein the new release singles chart page includes a current week chart position based on votes received from registered users during a current week, a current week point total based on votes received from registered users during the current week, a previous week chart position based on votes received from registered users during a previous week, a two week previous chart position based on votes received from registered users during a week two weeks prior to the current week, a top chart position attained on the new release singles chart page, and a number of weeks on the new release singles chart for each song included in the new release singles chart.

15. The computer system of claim 14, wherein the current week point total for each song is calculated by summing points associated with each registered user's familiarity and passion for each song and subtracting points associated with each registered user's burn for each song.

16. The computer system of claim 14, wherein the new release singles chart page includes:
   a heading containing information identifying the current week alphanumerically and numerically; and
   a buy column that can be used by the registered user to purchase one or more of the songs included in the new release singles chart page.

17. The computer system of claim 12, wherein the new release singles page includes:
   an alphabetical listing of songs having a song status of new release single;
   a vote column that can be used by the registered user to vote on one or more of the songs included in the new release singles page;
   a current week point total for each song included in the new release singles page based on votes received from registered users during a current week;
   a buy column that can be used by the registered user to purchase one or more of the songs included in the new release singles page; and
   a heading containing information identifying the current week alphanumerically and numerically.

18. The computer system of claim 17, wherein, when the registered user selects the vote column associated with one of the songs included in the new release singles page, the processor is adapted to cause the computer system to generate a song ratings page that can be used by the registered user to input consumer preference information relating to the song associated with the selected vote column, to display the song rating pages to the registered user, and to prompt the registered user to input consumer preference information relating to the song associated with the selected vote column.

19. The computer system of claim 1, wherein the consumer preference information that can be input by a registered user using the processor includes information regarding the registered user's familiarity, passion, and burn for a song included in the song information database, information indicating whether the registered user owns a CD or cassette containing the song included in the song information database, information indicating whether the registered user would like to hear the song included in the song information database on the registered user's favorite radio station, information indicating where the registered user first heard the song included in the song information database, and comments from the registered user relating to the song included in the song information database.

20. The computer system of claim 19, wherein the processor allows the registered user to indicate the registered user's degree of familiarity, passion, and burn for the song included in the song information database using scales ranging from 1 to 10.

21. The computer system of claim 19, wherein, if the registered user is not familiar with the song included in the song information database, the processor allows the registered user to input a reason for why the registered user is not familiar with the song included in the song information database using a drop down menu containing a listing of reasons for why the registered user might not be familiar with the song included in the song information database.

22. The computer system of claim 19, wherein, if the registered user does not like the song included in the song information database, the processor allows the registered user to input a reason for why the registered user does not like the song included in the song information database using a drop down menu containing a listing of reasons for why the registered user might not like the song included in the song information database.

23. The computer system of claim 19, wherein, if the registered user is tired of the song included in the song information database, the processor allows the registered user to input a reason for why the registered user is tired of the song included in the song information database using a drop down menu containing a listing of reasons for why the registered user might be tired of the song included in the song information database.

24. The computer system of claim 19, wherein, if the registered user indicates that the registered user owns a CD or cassette containing the song included in the song information database, the processor allows the registered user to input information identifying the retailer where the CD or cassette containing the song included in the song information database was purchased.

25. The computer system of claim 19, wherein, if the registered user indicates that the registered user does not own a CD or cassette containing the song included in the song information database, the processor allows the registered user to input information indicating why the CD or cassette containing the song included in the song information database has not been purchased using a drop down menu containing a listing of reasons for why the registered user might not own a CD or cassette containing the song included in the song information database.

26. The computer system of claim 19, wherein the processor allows the registered user to input information indicating where the registered user first heard the song included in the song information database using a drop down menu containing a listing of choices where the registered user might have first heard the song included in the song information database.

27. The computer system of claim 12, wherein the top recurrent chart page includes a numerical listing of songs having a song status of single archive based on votes received from registered users of the computer system.

28. The computer system of claim 27, wherein the top recurrent chart page includes:
   a current week chart position based on votes received from registered users during a current week, a current week point total based on votes received from registered users during the current week, a previous week chart position based on votes received from registered users during a previous week, a two week previous chart position based on votes received from registered users during a week two weeks prior to the current week, a top chart position attained on the top recurrent chart page, and a number of weeks on the top recurrent chart page for each song included in the top recurrent chart page;
   a heading containing information identifying the current week alphanumerically and numerically; and
   a buy column that can be used by the registered user to purchase one or more of the songs included in the top recurrent chart page.

29. The computer system of claim 12, wherein the archive page includes:
   a listing of songs having a song status of single archive;
   a vote column that can be used by the registered user to vote on one or more of the songs included in the archive page;
   a current week point total for each song included in the archive page based on votes received from registered users during a current week;
   a buy column that can be used by the registered user to purchase one or more of the songs included in the archive page; and
   a heading containing information identifying the current week alphanumerically and numerically.

30. The computer system of claim 29, wherein, when the registered user selects the vote column associated with one of the songs included in the archive page, the processor is adapted to cause the computer system to generate a song ratings page that can be used by the registered user to input consumer preference information relating to the song associated with the selected vote column, to display the song rating pages to the registered user, and to prompt the registered user to input consumer preference information relating to the song associated with the selected vote column.

31. The computer system of claim 12, wherein the singles library page includes a search engine that can be used by the registered user to search for songs having a song status of single library, the singles library page allowing the registered user to search for songs based on song title, artist name, and record label name.

32. The computer system of claim 31, wherein:
   the search engine generates a search results page including a listing of songs; and
   the processor is adapted to cause the computer system to allow the registered user to input consumer preference information relating to the songs included in the search results page.

33. The computer system of claim 12, wherein:
   the album library page includes a search engine that can be used by the registered user to search for albums having an album status of album library, the album library page allowing the registered user to search for albums based on album title, artist name, and record label name;
   the search engine generates a search results page including a listing of albums that can be used by the registered user to generate an album track listing for each album including in the listing of albums, each album track listing including a listing of songs; and
   the processor is adapted to cause the computer system to allow the registered user to input consumer preference information relating to the songs included in the album track listings for each album included in the search results page.

34. The computer system of claim 1, wherein:
   the processor is adapted to cause the computer system to automatically change the song status associated with a song based on a predetermined amount of time that the song is stored in the song information database included with the computer system; and
   the processor is adapted to cause the computer system to automatically change the album status associated with an album based on a predetermined amount of time that the album is stored in the song information database included with the computer system.

35. The computer system of claim 1, wherein:
   the processor is adapted to cause the computer system to automatically change the song status associated with a song from new release single to single archive to single library; and
   the processor is adapted to cause the computer system to automatically change the album status associated with an album from new new release album to album library.

36. The computer system of claim 1, wherein:
   songs having a song status of new release single include songs that have been stored in the song information database for less than 26 weeks or that have been stored in the song information database for more than 26 weeks but are still being actively promoted by a record label;
   songs having a song status of single archive include songs that have been stored in the song information database for more than 26 weeks or that have been stored in the song information database for less than 26 weeks but are not longer being actively promoted by a record label;
   songs having a song status of single library include songs that have been stored in the song information database for more than 52 weeks;
   albums having an album status of new release album include albums that have been stored in the song information database for less than 52 weeks or that have been stored in the song information database for more than 52 weeks but are still receiving promotional support from a record label; and
   albums having an album status of album library include albums that have been stored in the song information database for more than 52 weeks or that have been stored in the song information database for less than 52 weeks but are not longer being actively promoted by a record label.

37. The computer system of claim 1, wherein:
   the processor is adapted to cause the computer system to allow a registered user to recover a lost user password from the computer system by entering the registered user's email address into the computer system; and the processor is adapted to cause the computer system to automatically identify the registered user's user name and user password based on the registered user's email address and to automatically generate and send an email to the registered user containing the identified registered user's user name and user password.

38. The computer system of claim 1, wherein the songs included in the song information database include newly released singles, album tracks, or some combination thereof.

39. The computer system of claim 1, wherein the albums included in the song information database include newly released albums.

40. The computer system of claim 1, wherein:

the songs included in the song information database include songs having an associated song genre format of A/C, Alternative, Christian, Classic Rock, Country, Jazz, Rock, and Urban; and the albums included in the song information database include albums having an associated album genre format of A/C, Alternative, Christian, Classic Rock, Country, Jazz, Rock, and Urban.

41. The computer system of claim 1, wherein:

each subscribing client has an associated account type; and access to consumer preference information stored in the song information database by subscribing clients is limited based on account type.

42. The computer system of claim 41, wherein the associated account type for each subscribing client is a record label account type, a radio station account type, or a retailer account type.

43. The computer system of claim 1, wherein the songs and albums included in the song information database include all songs and albums released by a record label rather than a smaller subset of the songs and albums released by the record label generated using a pre-selection process.

44. The computer system of claim 43, wherein:

the pre-selection process is implemented using radio station personnel, consultants, or some combination thereof; and the smaller subset of songs and albums generated by the pre-selection process includes songs and albums selected by the radio station personnel, consultants, or some combination thereof.

45. The computer system of claim 1, wherein the processor is adapted to cause the computer system to allow subscribing clients to search and generate reports using the consumer preference information stored in the song information database based on genre format, artist name, song name, reporting period, registered user gender, registered user age, registered user income, registered user education, radio station, zip code, city, state, region, country, universe, registered user familiarity, registered user passion, registered user burn, whether or not a registered user would like to hear a song included in the song information database on the registered user's favorite radio station, whether or not a registered user owns a CD or cassette containing a song included in the song information database, where a registered user first heard a song included in the song information database, and whether or not a registered user has entered comments relating to a song included in the song information database.

* * * * *